US012592059B2

(12) United States Patent
Liao et al.

(10) Patent No.: US 12,592,059 B2
(45) Date of Patent: Mar. 31, 2026

(54) GLOBAL EMBEDDING LEARNING FROM DIFFERENT MODALITIES

(71) Applicant: eBay Inc., San Jose, CA (US)

(72) Inventors: Baohao Liao, Aachen (DE); Sanjika Hewavitharana, San Jose, CA (US); Michael Damian Kozielski, Aachen (DE); Friedrich Leonard Dahlmann, Aachen (DE); Shahram Khadivi, Herzogenrath (DE)

(73) Assignee: EBAY INC., San Jose, CA (US)

( * ) Notice: Subject to any disclaimer, the term of this patent is extended or adjusted under 35 U.S.C. 154(b) by 507 days.

(21) Appl. No.: 17/983,327

(22) Filed: Nov. 8, 2022

(65) Prior Publication Data

US 2024/0153246 A1      May 9, 2024

(51) Int. Cl.
*G06V 10/774* (2022.01)
*G06F 40/284* (2020.01)
(Continued)

(52) U.S. Cl.
CPC .......... *G06V 10/774* (2022.01); *G06F 40/284* (2020.01); *G06Q 30/0643* (2013.01); *G06V 10/761* (2022.01); *G06V 10/764* (2022.01)

(58) Field of Classification Search
CPC .. G06V 10/774; G06V 10/761; G06V 10/764; G06F 40/284; G06Q 30/0643
See application file for complete search history.

(56) References Cited

U.S. PATENT DOCUMENTS 10,970,768 B2    4/2021   Zheng et al.
11,301,732 B2    4/2022   Hu et al.
(Continued)

FOREIGN PATENT DOCUMENTS

CN      113792112 A     12/2021
CN      113792113 A     12/2021
(Continued)

OTHER PUBLICATIONS

Antol et al., "VQA: Visual Question Answering", In 2015 IEEE International Conference on Computer Vision (ICCV), Computer Vision Foundation (CVF), pp. 2425-2433 (9 pages).
(Continued)

*Primary Examiner* — Shefali D Goradia
(74) *Attorney, Agent, or Firm* — SCHWEGMAN LUNDBERG & WOESSNER, P.A.

(57) ABSTRACT

A system may receive, via a first user interface associated with an online marketplace, a multi-modality request to retrieve a listing for an item, the multi-modality request comprising at least a first image and a first natural language text associated with the item. The system may generate an item embedding based on inputting the first image and the first natural language text to a machine learning model and may generate a first vector associated with the first image and the first natural language text included in the multi-modality request. The system may cause presentation, via the first user interface associated with the online marketplace, of one or more listings for the item retrieved based at least in part on a similarity metric between the first vector and a second vector of a plurality of vectors associated with a plurality of listings.

20 Claims, 10 Drawing Sheets

(51) Int. Cl.
G06Q 30/0601        (2023.01)
G06V 10/74          (2022.01)
G06V 10/764         (2022.01)

(56)                References Cited

U.S. PATENT DOCUMENTS

| | | | | |
|---|---|---|---|---|
| 11,341,366 | B2 | 5/2022 | Niu et al. | |
| 12,141,236 | B1 * | 11/2024 | Arici | G06F 18/251 |
| 12,210,516 | B1 * | 1/2025 | Zhu | G06F 16/2425 |
| 12,354,011 | B2 * | 7/2025 | Biswas | G06N 3/044 |
| 2014/0330822 | A1 | 11/2014 | Makadia et al. | |
| 2020/0356592 | A1 | 11/2020 | Yada et al. | |
| 2021/0350081 | A1 * | 11/2021 | De Peuter | G06N 20/20 |
| 2022/0130499 | A1 | 4/2022 | Zhou et al. | |
| 2023/0401274 | A1 * | 12/2023 | Denninghoff | G06Q 30/0251 |

FOREIGN PATENT DOCUMENTS

| | | | |
|---|---|---|---|
| CN | 114399769 | A | 4/2022 |
| CN | 114821223 | A * | 7/2022 |
| CN | 118012980 | | 5/2024 |

OTHER PUBLICATIONS

Arici et al., "MLIM: Vision-and-Language Model Pre-training with Masked Language and Image Modeling", arXiv:2109.12178v1 [cs. CV] Sep. 24, 2021, 7 pages.

Ba et al., "Layer Normalization", arXiv:1607.06450v1 [stat.ML] Jul. 21, 2016, 14 pages.

Bianchi et al., "Query2Proc2Vec: Grounded Word Embeddings for eCommerce", In Proceedings of the 2021 Conference of the North American Chapter of the Association for Computational Linguistics: Human Language Technologies: Industry Papers, NAACL-HLT 2021, Jun. 6-11, 2021, Association for Computational Linguistics, pp. 154-162 (9 pages).

Chen et al., "Microsoft COCO Captions: Data Collection and Evaluation Servicer", arXiv:1504.00325v1 [cs.CV] Apr. 1, 2015, 7 pages.

Chen et al., "UNITER: Learning Universal Image-Text Representations", arXiv:1909.11740v1 [cs.CV] Sep. 25, 2019, 13 pages.

Desai et al., "VirTex: Learning Visual Representations from Textual Annotations", In IEEE Conference on Computer Vision and Pattern Recognition, CVPR 2021, Jun. 19-25, 2021, Computer Vision Foundation, pp. 11162-11173 (12 pages).

Devlin et al., "BERT: Pre-training of Deep Bidirectional Transformers for Language Understanding", In Proceedings of the 2019 Conference of the North American Chapter of the Association for Computational Linguistics: Human Language Technologies, NAACL-HLT 2019, Minneapolis, MN, USA, Jun. 2-7, 2019, vol. 1 (Long and Short Papers), Association for Computational Linguistics, pp. 4171-4186 (16 pages).

Dosovitskiy et al., "An Image is Worth 16×16 Words: Transformers for Image Recognition at Scale", In 9th International Conference on Learning Representations, ICLR 2021, Virtual Event, Austria, May 3-7, 2021, 16 pages.

Fan et al., "Automatic Generation of Product-Image Sequence in E-commerce", arXiv:12994v1 [cs.CV] Jun. 26, 2022, 9 pages.

Goyal et al., "Making the V in VQA Matter: Elevating the Role of Image Understanding in Visual Question Answering", International Journal of Computer Vision, 127(4):398-414, Springer, 17 pages.

Grbovic et al., "E-commerce in Your Inbox: Product Recommendations at Scale", In Proceedings of the 21th ACM SIGKDD International Conference on Knowledge Discovery and Data Mining, KDD '15, New York, NY, USA, Association for Computing Machinery, 2015, pp. 1809-1818 (10 pages).

Gui et al., "Training Vision-Language Transformers from Captions Alone", arXiv:2205.09256v1 [cs.CV] May 19, 2022, 15 pages.

He et al., "Deep Residual Learning for Image Recognition", In 2016 IEEE Conference on Computer Vision and Pattern Recognition, CVPR 2016, Las Vegas, NV, USA, Jun. 27-30, 2016, Computer Vision Foundation, pp. 770-778 (9 pages).

Hendrycks et al., "Bridging Nonlinearities and Stochastic Regularizers with Gaussian Error Linear Units", arX14:1606.08415v1 [cs.LG] Jun. 27, 2016, 6 pages.

Jing et al., "Visual search at Pinterest", In Proceedings of the 21st ACM SIGKDD International Conference on Knowledge Discovery and Data Mining, Sydney, NSW, Australia, Aug. 10-13, 2015, arXiv:1505.07647, 10 pages.

Joshi et al., SpanBERT: Improving Pre-training by Representing and Predicting Spans, Transactions of the Association for Computational Linguistics (TACL), 8:64-77, 2020, 14 pages.

Kazemzadeh et al., "ReferItGame: Referring to Objects in Photographs of Natural Scenes", In Proceedings of the 2014 Conference on Empirical Methods in Natural Language Processing (EMNLP 2014), Doha, Qatar, Association for Computational Linguistics, pp. 787-798 (12 pages).

Keenan et al., "Global Ecommerce Explained: Stats and Trends to Watch in 2021", downloaded from The Wayback Machine—https://web.archive/org/web/20220201005436/https://www.shopify.com/enterprise/global-ecommerce-statistics, 2021, 55 pages.

Kiefer et al., "Stochastic Estimation of the Maximum of a Regression Function", The Annals of Mathematical Statistics, 22(3):462-466, 1952, 5 pages.

Kingma et al., "Adam: A Method for Stochastic Optimization," In 3rd International Conference on Learning Representations, ICLR 2015, San Diego, CA, USA, May 7-9, 2015, Conference Track Proceedings, arXiv:1412.6980, 13 pages.

Li et al., "Vision-Language Intelligence: Tasks, Representation Learning, and large Models", arX14:2203.01922v1 [cs.CV] Mar. 3, 2022, 19 pages.

Li et al., "Unsupervised Vision-and-Language Pre-training Without Parallel Images and Captions", arXiv:2010.12831v2 [cs.CL] Apr. 11, 2021, 12 pages.

Li et al., "VisualBERT: A Simple and Performant Baseline for Vision and Language", arXiv:1908.03557v1 [cs.CV] Aug. 9, 2019, 14 pages.

Liu et al., "RoBERTa: A Robustly Optimized BERT Pretraining Approach", arXiv:1907.11692 v1 [cs.CL] Jul. 26, 2019, 13 pages.

Loshchilov et al., "Decoupled Weight Decay Regularization", In 7th International Conference on Learning Representations, ICLR 2019, New Orleans, LA, USA, May 6-9, 2019, 18 pages.

Lu et al., "VILBERT: Pretraining Task-Agnostic Visiolinguistic Representations for Vision-and-Language Tasks", In Advances in Neural Information Processing Systems 32: Annual Conference on Neural Information Processing Systems 2019, NeurIPS 2019, Dec. 8-14, 2019, Vancouver, BC, Canada, pp. 13-23 (11 pages).

Ma et al., "Are Multimodal Transformers Robust to Missing Modality?", 2022, Computer Vision Foundation, pp. 18177-18186 (10 pages).

Manning et al., "Chapter 8: Evaluation in Information Retrieval", An Introduction to Information Retrieval, Draft Apr. 1, 2009, online edition 2009 Cambridge University Press, Cambridge, England, 55 pages.

Ott et al., "FAIRSEQ: A Fast, Extensible Toolkit for Sequence Modeling", In Proceedings of the 2019 Conference of the North American Chapter of the Association for Computational Linguistics: Human Language Technologies, NAACL-HLT 2019, Minneapolis, MN, Jun. 2-7, 2019, 6 pages.

Plummer et al., "Flickr30k Entities: Collecting Region-to-Phrase Correspondences for Richer Image-to-Sentence Models", In 2015 IEEE International Conference on Computer Vision, ICCV 2015, Santiago, Chile, Dec. 7-13, 2015, Computer Vision Foundation, pp. 2641-2649 (9 pages).

Qi et al., "ImageBERT: Cross-modal Pre-training with Large-scale Weak-supervised Image-text Data", arXiv:2001.07966v2 [cs.CV] Jan. 23, 2020, 12 pages.

Radford et al., "Learning Transferable Visual Models from Natural Language Supervision", In Proceedings of the 38th International Conference on Machine Learning, ICML 2021, Jul. 18-24, 2021, Virtual Event, vol. 139 of Proceedings of Machine Learning Research (PMLR), pp. 8748-8763 (16 pages).

Sennrich et al., "Neural Machine Translation of Rare Words with Subword Units", In Proceedings of the 54th Annual Meeting of the

(56)            References Cited

OTHER PUBLICATIONS

Association for Computational Linguistics, ACL 2016, Aug. 7-12, 2016, Berlin, Germany, vol. 1: Long Papers, The Association for Computer Linguistics, 11 pages.

Shankar et al., "Deep Learning Based Large Scale Visual Recommendation and Search for e-Commerce", arXiv:1703.02344v1 [cs.CV] Mar. 7, 2017, 9 pages.

Sharma et al., "Conceptual captions: A Cleaned, Hypernymed, Image Alt-text Dataset for Automatic Image Captioning", In Proceedings of the 56th Annual Meeting of the Association for Computational Linguistics (vol. 1: Long Papers), pp. 2556-2565 (10 pages).

Song et al., "Deep Metric Learning via Lifted Structured Feature Embedding", In 2016 IEEE Conference on Computer Vision and Pattern Recognition, CVPR 2016, Las Vegas, NV, USA, Jun. 27-30, 2016, Computer Vision Foundation, pp. 4004-4012 (9 pages).

Su et al., "VL-BERT: Pre-training of Generic Visual-Linguistic Representations", In 8th International Conference on Learning Representations, ICLR 2020, Addis Ababa, Ethiopia, Apr. 26-30, 2020, 16 pages.

Suhr et al., "A Corpus for Reasoning About Natural Language Grounded in Photographs", In Proceedings of the 57th Conference of the Association for Computational Linguistics, ACL 2019, Florence, Italy, July 28-Aug. 2, 2019, vol. 1: Long Papers, Association for Computational Linguistics, pp. 6418-6428 (11 pages).

Tan et al., "LXMERT: Learning Cross-Modality Encoder Representations from Transformers", In Proceedings of the 2019 Conference on Empirical Methods in Natural Language Processing and the 9th International Joint Conference on Natural Language Processing, EMNLP-IJCNLP 2019, Hong Kong, China, Nov. 3-7, 2019, Association for Computational Linguistics, pp. 5099-5110 (12 pages).

Vaswani et al., "Attention is All You Need", In Advances in Neural Information Processing Systems 30: Annual Conference on Neural Information Processing Systems 2017, Dec. 4-9, 2017, Long Beach, CA, USA, pp. 5998-6008 (11 pages).

Yang et al., "Visual search at eBay", In Proceedings of the 23rd ACM SIGKDD International Conference on Knowledge Discovery and Data Mining, Halifax, NS, Canada, Aug. 13-17, 2017, arXiv:1706.03154, 10 pages.

Yang et al., "An Evaluation of Statistical Approaches to Text Categorization", School of Computer Science, Pittsburgh, PA, Apr. 10, 1997, 12 pages.

You et al., "Image Captioning with Semantic Attention", In 2016 IEEE Conference on Computer Vision and Pattern Recognition, CVPR 2016, Las Vegas, NV, Jun. 27-30, 2016, Computer Vision Foundation, pp. 4651-4659 (9 pages).

Yu et al., "CommerceMM: Large-Scale Commerce MultiModal Representation Learning with Omni Retrieval", arXiv:2202.07247v1 [cs.CV] Feb. 15, 2022, 10 pages.

Zellers et al., "From recognition to cognition: Visual Commonsense Reasoning", In IEEE Conference on Computer Vision and Pattern Recognition, CVPR 2019, Long Beach, CA, Jun. 16-20, 2019, Computer Vision Foundation, pp. 6720-6731 (12 pages).

"European Application Serial No. 23206238.0, Extended European Search Report mailed Feb. 7, 2024", 9 pgs.

Chen, Nawei, "A Survey of Indexing and Retrieval of Multimodal Documents: Text and Images", [Online]. Retrieved from the Internet: URL: https: citeseerx.ist.psu.edu document?repid=replandtype=pdfanddoi=b324f14986cc10bf86a38b51cffb800147cbf764, (Feb. 28, 2006), 1-40.

"European Application Serial No. 23206238.0, Communication Pursuant to Article 94(3) EPC mailed Feb. 18, 2025", 9 pgs.

* cited by examiner 110-a 130-a 110-b 130-b 105-a 105-b 105-c 130-c 110-c 130-d 110-d Data Center

120

140

Cloud
Platform

135

115

125

100

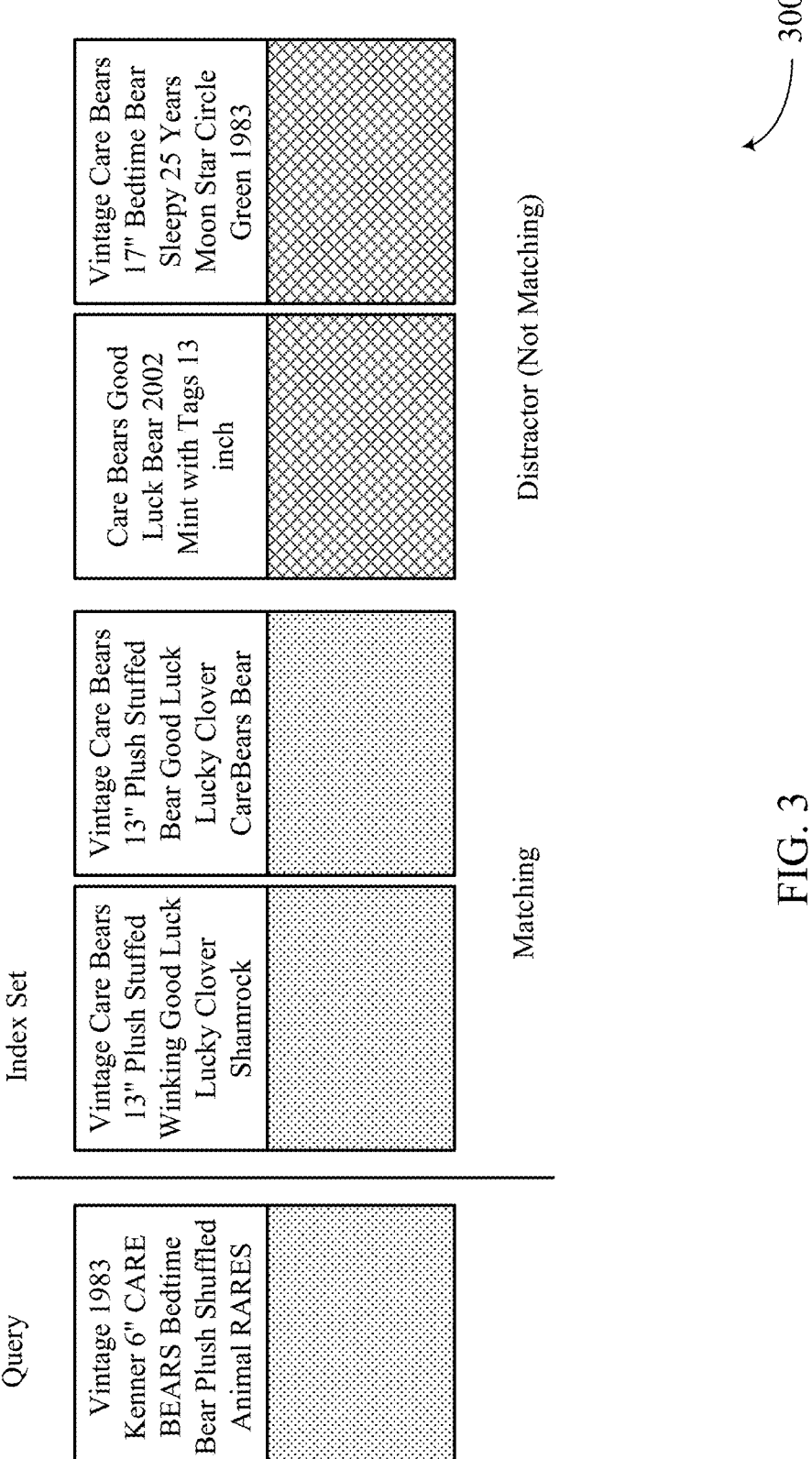

Query

Vintage 1983 Kenner 6" CARE BEARS Bedtime Bear Plush Shuffled Animal RARES

Index Set

Vintage Care Bears 13" Plush Stuffed Winking Good Luck Lucky Clover Shamrock

Vintage Care Bears 13" Plush Stuffed Bear Good Luck Lucky Clover CareBears Bear

Matching

Care Bears Good Luck Bear 2002 Mint with Tags 13 inch

Vintage Care Bears 17" Bedtime Bear Sleepy 25 Years Moon Star Circle Green 1983

Distractor (Not Matching)

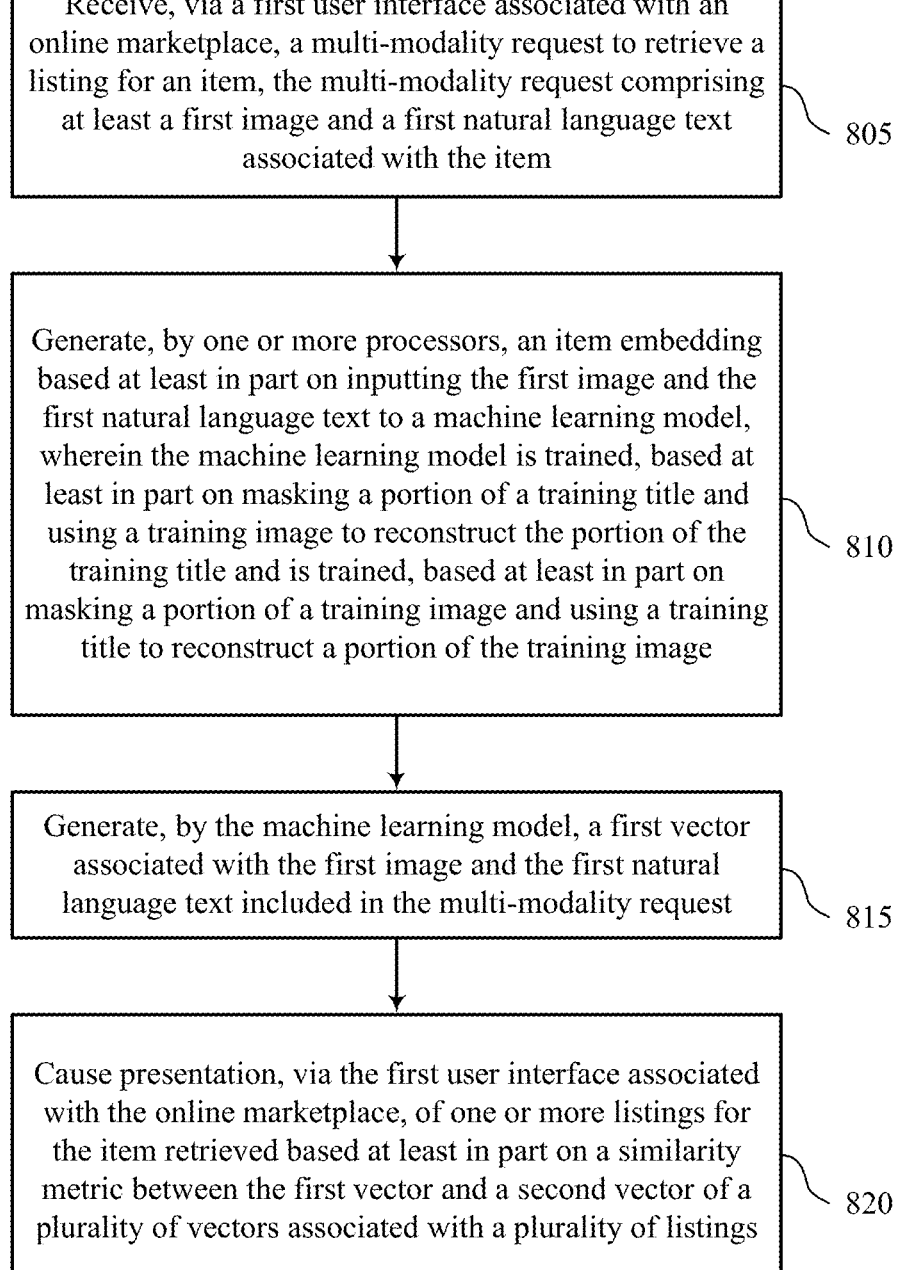

Receive, via a first user interface associated with an online marketplace, a multi-modality request to retrieve a listing for an item, the multi-modality request comprising at least a first image and a first natural language text associated with the item

805

Generate, by one or more processors, an item embedding based at least in part on inputting the first image and the first natural language text to a machine learning model, wherein the machine learning model is trained, based at least in part on masking a portion of a training title and using a training image to reconstruct the portion of the training title and is trained, based at least in part on masking a portion of a training image and using a training title to reconstruct a portion of the training image

810

Generate, by the machine learning model, a first vector associated with the first image and the first natural language text included in the multi-modality request

815

Cause presentation, via the first user interface associated with the online marketplace, of one or more listings for the item retrieved based at least in part on a similarity metric between the first vector and a second vector of a plurality of vectors associated with a plurality of listings

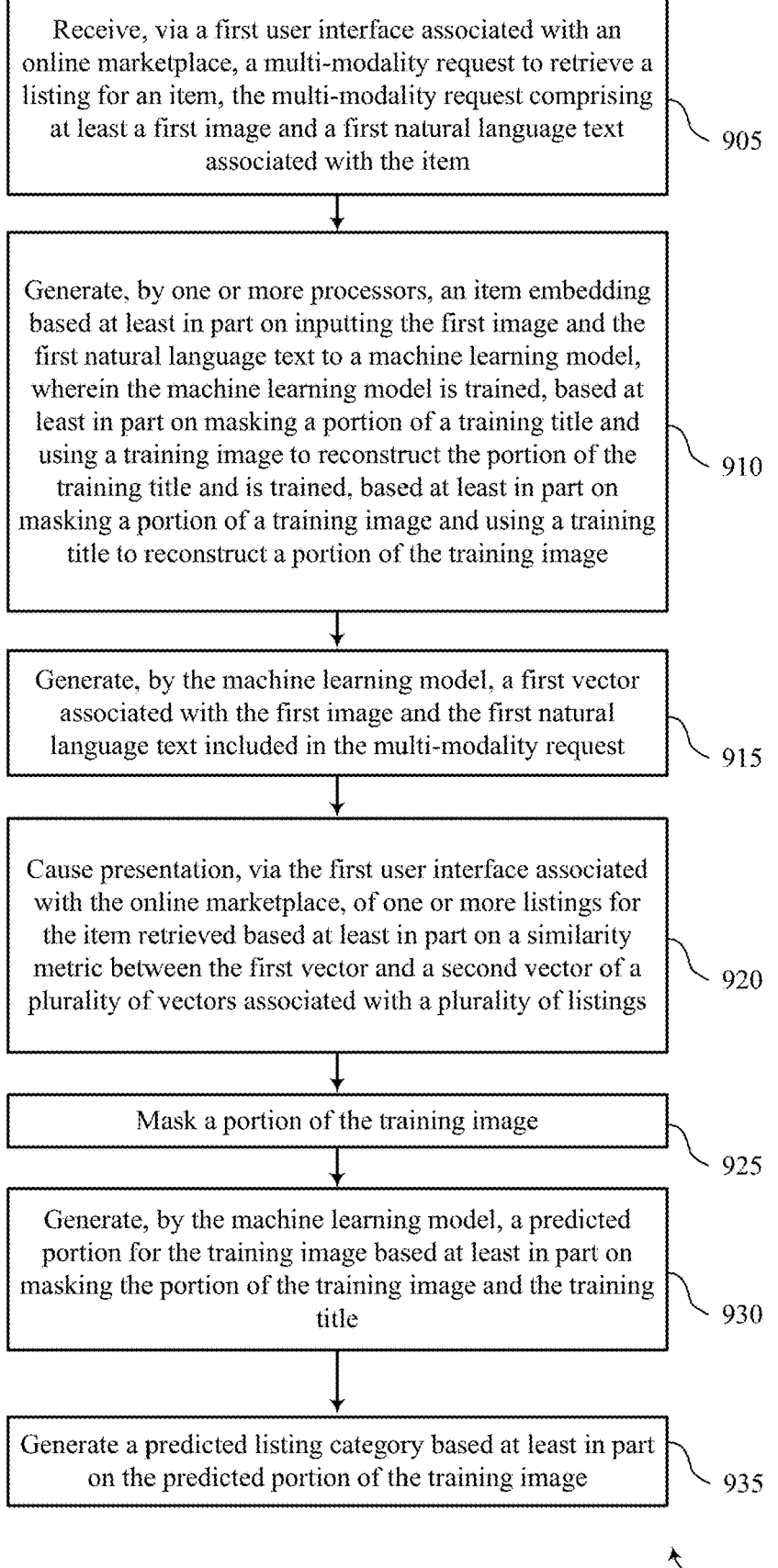

Receive, via a first user interface associated with an online marketplace, a multi-modality request to retrieve a listing for an item, the multi-modality request comprising at least a first image and a first natural language text associated with the item ⟍ 905

Generate, by one or more processors, an item embedding based at least in part on inputting the first image and the first natural language text to a machine learning model, wherein the machine learning model is trained, based at least in part on masking a portion of a training title and using a training image to reconstruct the portion of the training title and is trained, based at least in part on masking a portion of a training image and using a training title to reconstruct a portion of the training image ⟍ 910

Generate, by the machine learning model, a first vector associated with the first image and the first natural language text included in the multi-modality request ⟍ 915

Cause presentation, via the first user interface associated with the online marketplace, of one or more listings for the item retrieved based at least in part on a similarity metric between the first vector and a second vector of a plurality of vectors associated with a plurality of listings ⟍ 920

Mask a portion of the training image ⟍ 925

Generate, by the machine learning model, a predicted portion for the training image based at least in part on masking the portion of the training image and the training title ⟍ 930

Generate a predicted listing category based at least in part on the predicted portion of the training image ⟍ 935

FIG. 9      ⟍ 900

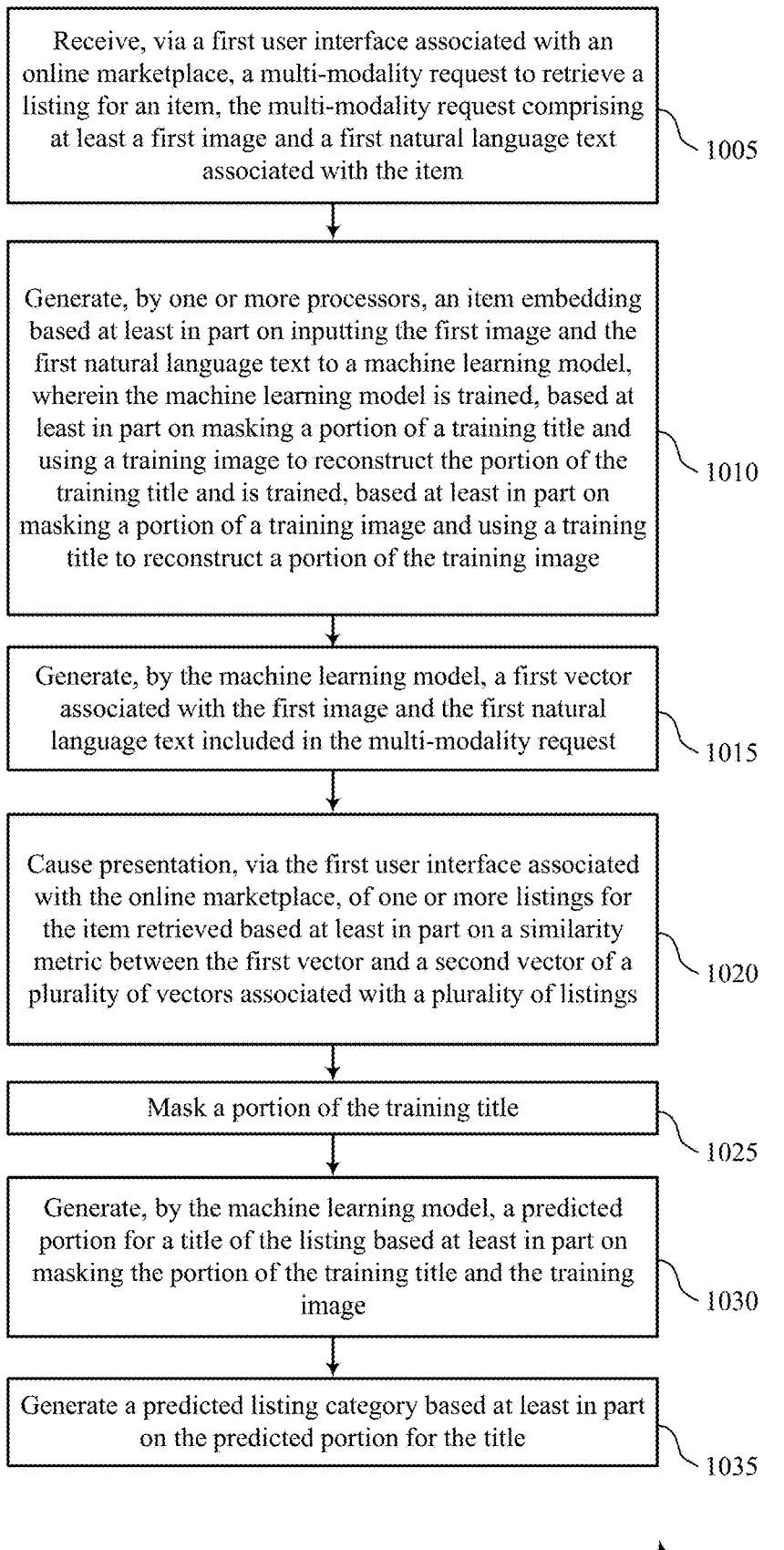

Receive, via a first user interface associated with an online marketplace, a multi-modality request to retrieve a listing for an item, the multi-modality request comprising at least a first image and a first natural language text associated with the item

1005

Generate, by one or more processors, an item embedding based at least in part on inputting the first image and the first natural language text to a machine learning model, wherein the machine learning model is trained, based at least in part on masking a portion of a training title and using a training image to reconstruct the portion of the training title and is trained, based at least in part on masking a portion of a training image and using a training title to reconstruct a portion of the training image

1010

Generate, by the machine learning model, a first vector associated with the first image and the first natural language text included in the multi-modality request

1015

Cause presentation, via the first user interface associated with the online marketplace, of one or more listings for the item retrieved based at least in part on a similarity metric between the first vector and a second vector of a plurality of vectors associated with a plurality of listings

1020

Mask a portion of the training title

1025

Generate, by the machine learning model, a predicted portion for a title of the listing based at least in part on masking the portion of the training title and the training image

1030

Generate a predicted listing category based at least in part on the predicted portion for the title

GLOBAL EMBEDDING LEARNING FROM DIFFERENT MODALITIES

FIELD OF TECHNOLOGY

The present disclosure relates generally to database systems and data processing, and more specifically to global embedding learning from different modalities.

BACKGROUND

A platform of an online marketplace often permits sellers to provide a description of an item being listed for sale. An item may refer to a product with a particular set of unique properties. When a prospective buyer initiates a product search, the platform (e.g., a search platform) of the online marketplace identifies a set of item listings that match the product search, and transfers the listings of the items available for sale for presentation to the prospective buyer. A browser may present to the seller, a digital form for inputting attributes related to a listing. In some instances, conventional text descriptions may be missing words or key terms. Accordingly, the platform of the online marketplace may return listings that are unrelated or otherwise categorized differently than a desired listing.

SUMMARY

A method is described. The method may include receiving, via a first user interface associated with an online marketplace, a multi-modality request to retrieve a listing for an item, the multi-modality request comprising at least a first image and a first natural language text associated with the item, generating, by one or more processors, an item embedding based at least in part on inputting the first image and the first natural language text to a machine learning model, wherein the machine learning model is trained, based at least in part on masking a portion of a training title and using a training image to reconstruct the portion of the training title and is trained, based at least in part on masking a portion of a training image and using a training title to reconstruct a portion of the training image, generating, by the machine learning model, a first vector associated with the first image and the first natural language text included in the multi-modality request, and causing presentation, via the first user interface associated with the online marketplace, of one or more listings for the item retrieved based at least in part on a similarity metric between the first vector and a second vector of a plurality of vectors associated with a plurality of listings.

An apparatus is described. The apparatus may include a processor, memory coupled with the processor, and instructions stored in the memory. The instructions may be executable by the processor to cause the apparatus to receive, via a first user interface associated with an online marketplace, a multi-modality request to retrieve a listing for an item, the multi-modality request comprising at least a first image and a first natural language text associated with the item, generate, by one or more processors, an item embedding based at least in part on inputting the first image and the first natural language text to a machine learning model, wherein the machine learning model is trained, based at least in part on masking a portion of a training title and using a training image to reconstruct the portion of the training title and is trained, based at least in part on masking a portion of a training image and using a training title to reconstruct a portion of the training image, generate, by the machine learning model, a first vector associated with the first image and the first natural language text included in the multi-modality request, and cause presentation, via the first user interface associated with the online marketplace, of one or more listings for the item retrieved based at least in part on a similarity metric between the first vector and a second vector of a plurality of vectors associated with a plurality of listings.

Another apparatus is described. The apparatus may include means for receiving, via a first user interface associated with an online marketplace, a multi-modality request to retrieve a listing for an item, the multi-modality request comprising at least a first image and a first natural language text associated with the item, means for generating, by one or more processors, an item embedding based at least in part on inputting the first image and the first natural language text to a machine learning model, wherein the machine learning model is trained, based at least in part on masking a portion of a training title and using a training image to reconstruct the portion of the training title and is trained, based at least in part on masking a portion of a training image and using a training title to reconstruct a portion of the training image, means for generating, by the machine learning model, a first vector associated with the first image and the first natural language text included in the multi-modality request, and means for causing presentation, via the first user interface associated with the online marketplace, of one or more listings for the item retrieved based at least in part on a similarity metric between the first vector and a second vector of a plurality of vectors associated with a plurality of listings.

A non-transitory computer-readable medium storing code is described. The code may include instructions executable by a processor to receive, via a first user interface associated with an online marketplace, a multi-modality request to retrieve a listing for an item, the multi-modality request comprising at least a first image and a first natural language text associated with the item, generate, by one or more processors, an item embedding based at least in part on inputting the first image and the first natural language text to a machine learning model, wherein the machine learning model is trained, based at least in part on masking a portion of a training title and using a training image to reconstruct the portion of the training title and is trained, based at least in part on masking a portion of a training image and using a training title to reconstruct a portion of the training image, generate, by one or more processors, a first vector associated with the first image and the first natural language text included in the multi-modality request, and cause presentation, via the first user interface associated with the online marketplace, of one or more listings for the item retrieved based at least in part on a similarity metric between the first vector and a second vector of a plurality of vectors associated with a plurality of listings.

In some examples of the method, apparatuses, and non-transitory computer-readable medium described herein, training the machine learning model may include operations, features, means, or instructions for masking a portion of the training image, generating, by the machine learning model, a predicted portion for the training image based on masking the portion of the training image and the training title, and generating a predicted listing category based on the predicted portion of the training image.

In some examples of the method, apparatuses, and non-transitory computer-readable medium described herein, training the machine learning model may include operations, features, means, or instructions for masking a portion of the training title, generating, by the machine learning model, a predicted portion for the title based on masking the portion of the training title and the training image, and generating a predicted listing category based on the predicted portion for the title.

In some examples the method, apparatuses, and non-transitory computer-readable medium described herein may include operations, features, means, or instructions for determining, by the machine learning model, a similarity metric between the first vector and a set of multiple vectors associated with the set of multiple categories, and associating, by the machine learning model, the first vector with the first category based on a similarity metric between the first vector and one or more vectors classified by the machine learning model as being associated with the first category.

Some examples of the method, apparatuses, and non-transitory computer-readable medium described herein may further include operations, features, means, or instructions for generating, by the machine learning model, a second vector associated with the second image and the second natural language text included in the multi-modality query, associating, by the machine learning model, the second vector with the first category, and comparing the second vector with a set of multiple vectors that include the first vector, where the first vector may be associated with the first category based on the first vector and the second vector satisfying a similarity metric.

In some examples of the method, apparatuses, and non-transitory computer-readable medium described herein, causing presentation of the one or more listings for the item may include operations, features, means, or instructions for causing presentation, via the second user interface associated with the online marketplace, of one or more listings for the item from the first category, where the one or more listings that include a second image that may be different than the first image, a second natural language text that differs from the first natural language text, or both.

Some examples of the method, apparatuses, and non-transitory computer-readable medium described herein may further include operations, features, means, or instructions for comparing the portion of the reconstructed image with the portion of the reconstructed title and classifying the listing for the item using the reconstructed image and the reconstructed title based on the portion of the reconstructed image being associated with the portion of the reconstructed title.

BRIEF DESCRIPTION OF THE DRAWINGS

FIG. 3 illustrates an example of a block diagram that supports global embedding learning from different modalities in accordance with aspects of the present disclosure.

FIGS. 8 through 10 show flowcharts illustrating methods that support global embedding learning from different modalities in accordance with aspects of the present disclosure.

DETAILED DESCRIPTION

In some instances, a machine learning model may be trained such that it may retrieve one or more listings for an item. For example, a machine learning model may be trained by masking (e.g., removing, obfuscating) portions of a request (e.g., a multi-modality request) that includes both text and an image. Portions of the text and image may be masked and reconstructed by the model. That is, the machine learning model may reconstruct the image and title—including the previously masked portions of the image and title. Training the machine learning model may allow for it to effectively retrieve similar items from an online marketplace and display the results (e.g., the similar items) to a user. For example, a buyer may provide a multi-modality request to retrieve a listing of an item for sale and the trained machine learning model may retrieve one or more listings for similar items based on the text and image provided by the seller.

Moreover, the trained model may be trained to classify one or more items associated with a multi-modality request. For example, the machine learning model may be trained by masking (e.g., removing, obfuscating) portions of the text and image associated with a product (e.g., a listing) and reconstructing the text and image. That is, the machine learning model may reconstruct the image and title—including the previously masked portions of the image and title. The machine learning model may thus effectively classify an item to be listed for sale within a particular product category. For example, a seller may provide a multi-modality request of an item to be listed for sale and the trained machine learning model may classify the item based on the text and image provided by the seller. Thus the techniques described herein may effectively train a model (or models) to learn embedding equally from image text modalities, which may assist buyers and sellers in efficiently retrieving and classifying items (e.g., products) on an online marketplace.

Aspects of the disclosure are initially described in the context of an environment supporting an on-demand database service. Aspects of the disclosure are further illustrated by and described with reference to machine learning systems, block diagrams, process flows, apparatus diagrams, system diagrams, and flowcharts that relate to global embedding learning from different modalities.

Figure 1:
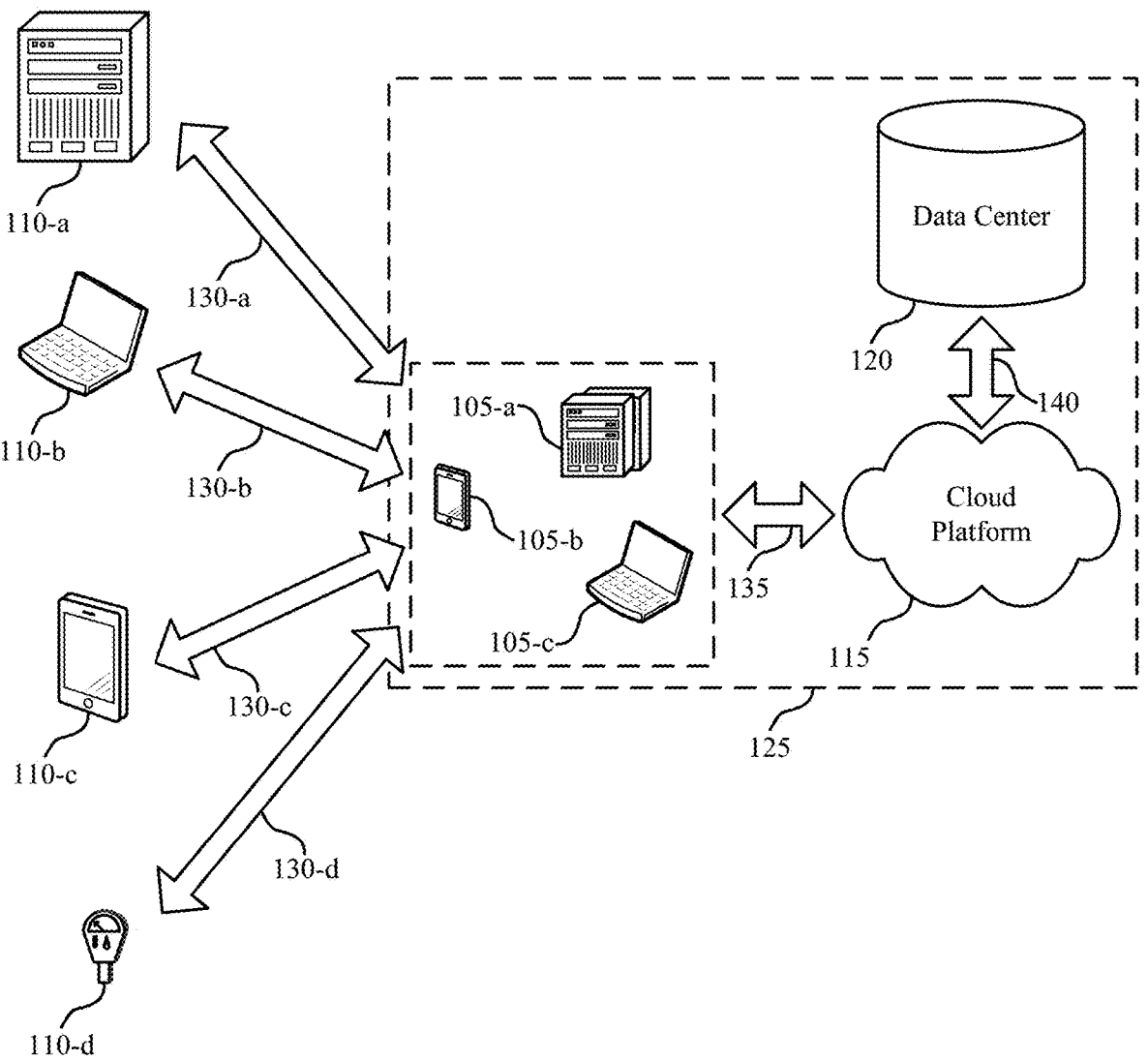
FIG. 1 illustrates an example of a computer-implemented system that supports global embedding learning from different modalities in accordance with aspects of the present disclosure.

FIG. 1 illustrates an example of a system 100 for cloud computing that supports global embedding learning from different modalities in accordance with various aspects of the present disclosure. The system 100 includes cloud clients 105, user devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple user devices 110. The interactions 130 may include communications, opportunities, purchases, sales, or any other interaction between a cloud client 105 and a user device 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

User devices 110 may interact with the cloud client 105 in person or via phone, email, web, text messages, mail, or any other appropriate form of interaction (e.g., interactions 130-*a*, 130-*b*, 130-*c*, and 130-*d*) transmitted, received, or otherwise communicated via a network connection over a communication network (e.g., the Internet, cellular network, etc.). The interaction 130 may be a business-to-business (B2B) interaction or a business-to-consumer (B2C) interaction. A user device 110 may also be referred to as a customer, a potential customer, a lead, a client, or some other suitable terminology. In some cases, the user device 110 may be an example of a user device, such as a server (e.g., user device 110-*a*), a laptop (e.g., user device 110-*b*), a smartphone (e.g., user device 110-*c*), or a sensor (e.g., user device 110-*d*). In other cases, the user device 110 may be another computing system. In some cases, the user device 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a user device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a user device 110 and the cloud client 105. Data center 120 may utilize multiple redundancies for security purposes. In some cases, the data stored at data center 120 may be backed up by copies of the data at a different data center (not pictured).

Server system 125 may include cloud clients 105, cloud platform 115, and data center 120. In some cases, data processing may occur at any of the components of server system 125, or at a combination of these components. In some cases, servers may perform the data processing. The servers may be a cloud client 105 or located at data center 120.

In some instances, a machine learning model may be trained such that it may retrieve one or more listings for an item. For example, a machine learning model may be trained by masking (e.g., removing, obfuscating) portions of a request (e.g., a multi-modality request) to the server system 125 that includes both text and an image. Portions of the text and image may be masked and reconstructed by the model. That is, the machine learning model may reconstruct the image and title—including the previously masked portions of the image and title. Training the machine learning model may allow for it to effectively retrieve similar items from an online marketplace and display the results (e.g., the similar items) to a user. For example, a buyer may provide a multi-modality request to retrieve a listing of an item for sale and the trained machine learning model may retrieve one or more listings for similar items based on the text and image provided by the seller.

In other examples, the machine learning model may be trained to classify a listing associated with a multi-modality request to the server system 125. The server system 125 may include a machine learning model that may be trained by masking (e.g., removing, obfuscating) portions of the text and image associated with a product (e.g., a listing) and reconstructing the text and image. That is, the machine learning model may reconstruct the image and title—including the previously masked portions of the image and title. Training the machine learning model may allow for it to effectively classify an item to be listed for sale within a particular product category. For example, a seller may provide a multi-modality request of an item to be listed for sale and the trained machine learning model may classify the item based on the text and image provided by the seller. Thus the techniques described herein may effectively train a model (or models) to learn embedding equally from image text modalities, which may assist buyers and sellers in efficiently retrieving and classifying items (e.g., products) on an online marketplace.

Figure 2:
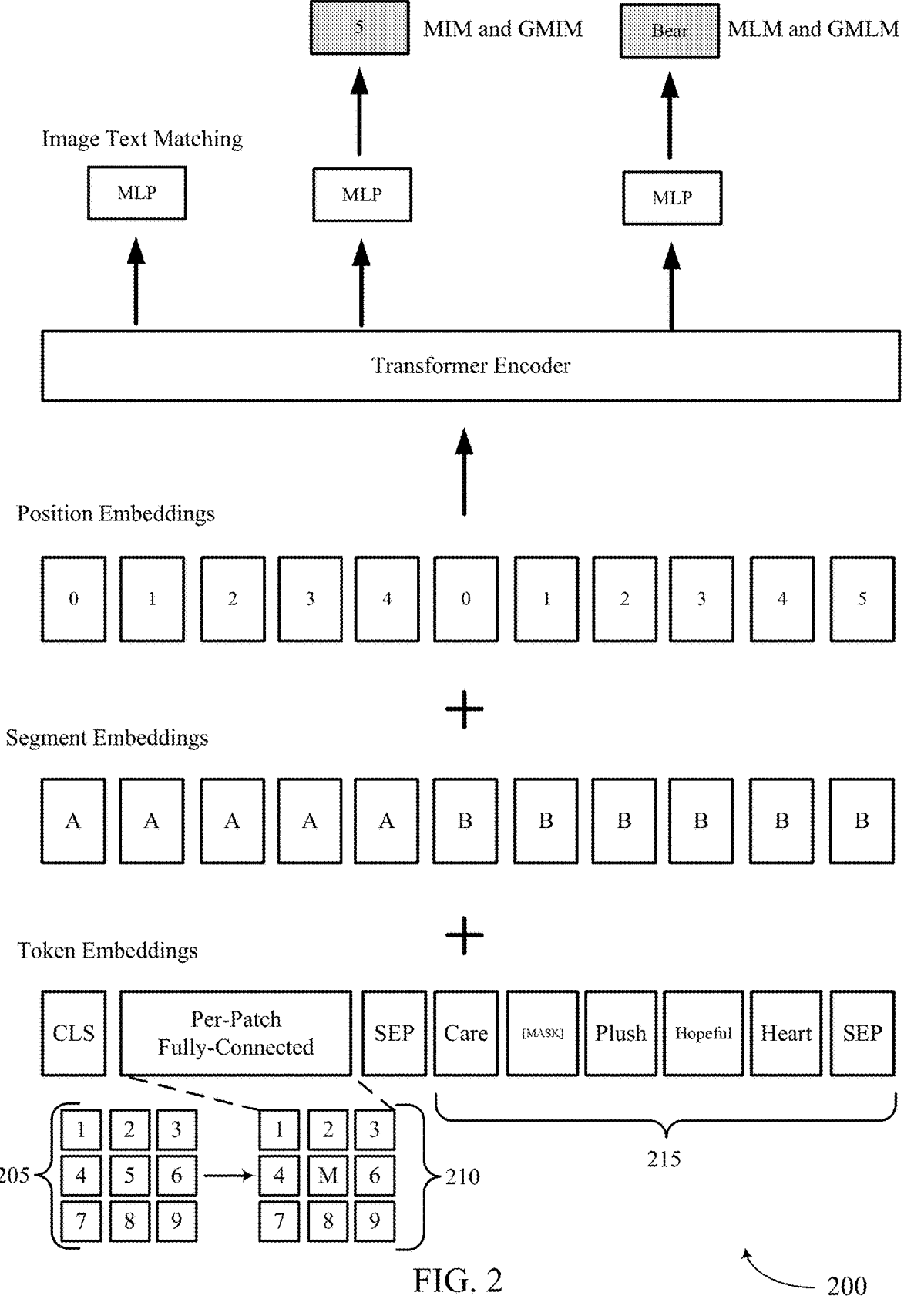
FIG. 2 illustrates an example of a machine learning model that supports global embedding learning from different modalities in accordance with aspects of the present disclosure.

FIG. 2 illustrates aspects of a machine learning model 200 that supports global embedding learning from different modalities in accordance with aspects of the present disclosure. The machine learning model 200 may be used to list (e.g., categorize) or retrieve a listing for an item on an online marketplace. For example, the machine learning model 200 may retrieve a listing for an item based on receiving a request (e.g., a multi-modality request). For example, a user (e.g., buyer) may input a multi-modality request for an item that includes an image (e.g., a first image) and a title for the listing. The title may include a natural language text (e.g., a first natural language text) as the title for the listing. The machine learning model 200 may be trained by masking and reconstructing portions of the image and of the title. Once trained, the machine learning model 200 may generate a first vector associated with the image and the natural language and may retrieve one or more listings based on a similarity metric between the generated vector and respective vectors of listings on the online marketplace.

The machine learning model 200 may also be used to categorize a listing for an item based on an item embedding associated with an image and text included in a multi-modality request. For example, a user (e.g., seller) may input a multi-modality request to list an item (e.g., a product) for sale that includes an image (e.g., a first image) and a title for the listing. The title may include a natural language text (e.g., a first natural language text) as the title for the listing. The machine learning model 200 may be trained by masking and reconstructing portions of the image and of the title. Once trained, the machine learning model 200 may receive multi-modality requests of an item to be listed for sale and the trained machine learning model 200 may classify the item based on the text and image provided by the seller.

The machine learning model 200 may support an image-text embedding model (ITEm) to receive an analyze image and text modalities. The machine learning model 200 may use a transformer encoder as a base layer such that the image and text may be encoded into different embeddings within different embedding layers. The embeddings may be provided to a bidirectional self-attention transformer encoder to model the cross-modal relationship between the received image and text. In some instances, ITEm may be pre-trained with one or more unsupervised tasks, which may allow the machine learning model 200 to learn the relationship between image and text so that it can attend to both modalities (e.g., image and text) as equally as possible.

In some examples, ITEm may be pre-trained for a binary matching prediction task. For example, during pre-training, a product image and title may not always be matched. In some instances (e.g., 50% of the time), the product title may be the actual title of the image. In other instances (e.g., 50% of the time), the product title may be a random title from an arbitrary product. The global representation (e.g., the output representation) may be fed into a fully-connected layer to obtain a score (e.g., a vision-text similarity score). In some instances, a binary classification loss may be used for optimizing the score.

The machine learning model 200 (e.g., ITEm) may be pre-trained using masked language modeling (MLM) to predict missing tokens in a sequence. For example, in a portion of title tokens (e.g., 15% of the title tokens), some are replaced by [MASK] (e.g., 80% are replaced by [MASK]), some are replaced by a random token (e.g., 10% are replaced by a random token), and some are kept unchanged (e.g., 10% are kept unchanged). The machine learning model 200 may include a fully-connected layer and a token embedding layer on top of the output representations of the tokens to predict the tokens. In some instances, a cross-entropy loss may be used to optimize the prediction. As described herein, masked portions of an image 205 or of text may be referred to as "patches" (e.g., masked patches) and "tokens" (e.g., masked tokens). Accordingly, as used herein, "patches" and "tokens" may be used interchangeably.

The machine learning model 200 (e.g., ITEm) may be pre-trained using masked image modeling (MIM) to construct the masked patches of an image. For example, in a portion of image patches (e.g., 15% of the title tokens), some are replaced by [MASK] (e.g., 80% are replaced by [MASK]) and some are kept unchanged (e.g., 20% are kept unchanged). The machine learning model 200 may include a fully-connected layer on top of the masked output representations to project the images back to an original patch dimension. In some instances, a L2 loss may be applied to regress the original image patches.

The machine learning model 200 (e.g., ITEm) may be pre-trained using masked language modeling based on global information (GMLM). The machine learning model

200 may predict missing tokens with a global output representation and corresponding position embeddings (e.g., as opposed to individual output representations). For example, a masked token may be represented by $t_n$ and the machine learning model 200 may predict the original token with its own position embedding $p_n$ and the global output representation $h([CLS])$ (e.g., $y_n = f(h([CLS]), p_n)$). The machine learning model 200 may implement the representation function $f(.)$ as a 2-layer feed-forward network with GeLU activation and layer normalization. In some instances, $y_n$ may be used to predict the masked token $t_n$. The machine learning model 200 may thus summarize the information of the masked tokens in the global output representation.

The machine learning model 200 (e.g., ITEm) may be pre-trained using masked image modeling based on global information (GMIM). Similar to GMLM, GMIM may construct the masked patches with a global output representation and an individual position embeddings, which may allow the machine learning model 200 to summarize the information of masked patches in a global output representation. For example, $i_m$ may be a masked patch and $p_m$ may be position embedding. The function $g(.)$ may share the same architecture as $f(.)$ and $z_m = g(h([CLS]), p_m)$ may be used to construct the masked patch (e.g., the masked portion "M" of the image 210).

Accordingly, by combining ITM, MLM, MIM, GMLM and GMIM, the final loss optimization of the machine learning model 200 is $L_{total} = \lambda_{ITM} L_{ITM} + \lambda_{MLM} L_{MLM} + \lambda_{GMLM} L_{GMLM} + \lambda_{MIM} L_{MIM} + \lambda_{GMIM} L_{GMIM}$. The machine learning model 200 may, empirically, perform well without tuning the interpolation weight 2. In some instances, the machine learning model may only need to set $\lambda_{ITM} = 1$, $\lambda_{MLM} = \lambda_{GMLM} = 0.1$, and $\lambda_{MIM} = \lambda_{GMIM} = 0.1$.

During a first training phase, the machine learning model 200 may be trained based on receiving a multi-modality request to retrieve a listing for an item. For example, the machine learning model 200 may receive input from one or more users or "buyers" that may intend to purchase one or more items (e.g., products) via an online marketplace. The buyer may be a user operating a user device, such as a user device 110 as described with respect to FIG. 1. The buyer may input a number of parameters describing the item to purchase via an online marketplace. In an example, the user device 110 may present a graphical user interface to display the listings. A buyer may input a multi-modality request to retrieve a listing of an item (e.g., a product) for sale that includes an image 205 (e.g., a first image 205) and a title for the listing. The title may include a natural language text (e.g., a first natural language text) as the title for the listing.

In some cases, the buyer may input the multi-modality request and the machine learning model 200 may generate an item embedding associated with the image 205 and the text included in the multi-modality request. As used herein, an "item embedding" may refer to a vector representation of the item, which may be associated with a particular category (or categories) that the item is associated with. A listing may be mapped to a particular category (e.g., a particular product category) where the items listed for sale have the same or similar characteristics, but may permit some variation to exist between the items while still being mapped to the same category.

As described herein and shown in FIG. 3, machine learning model 200 may be trained using position embeddings, segment embeddings, and token embeddings. Upon receiving a multi-modality request (e.g., natural-language text and an image), a system supporting the machine learning model 200 may parse the natural language text to generate a title token. At least a portion of the title token may be masked (e.g., removed, obfuscated) before providing the title token to the transformer encoder. Similarly, the system may divide (e.g., split) the image into multiple sub-images to generate an image token, where each sub-image depicts a portion of the image. At least a portion of the image token may be masked (e.g., removed, obfuscated) before providing the image token to the transformer encoder. The title token and the image token may be provided to the transformer encoder according to their respective segment embeddings and position embeddings.

By way of example, the input text 215 may be "Care Bear Plush Hopeful Heart" and the image 205 may be of a plush bear. The image token may be represented by the "Per-Patch Fully-Connected" and at least one sub-image (e.g., the masked portion "M" of the image 210) may be masked. Additionally or alternatively, the title token may be represented by "Care [MASK] Plush Hopeful Heart." The image token may correspond to position embeddings 0-4 and segment embedding A, and the title token may correspond to position embeddings 0-4 and segment embedding B.

The transformer encoder may utilize image text matching to associate the image token and the title token. Moreover, the transformer encoder may utilize MIM and GMIM, as described herein, to reconstruct the masked portion of the image (e.g., the masked portion "M" of the image 210) and MLM and GMLM to reconstruct the masked portion of the title (e.g., the masked portion of the title token).

In some examples, the machine learning model 200 may generate one or more vectors associated with the request and may determine a similarity (e.g., a similarity metric) between two or more vectors. For example, the machine learning model 200 may generate a first vector associated with the image (e.g., the bear) and the text included in the multi-modality request (e.g., Care Bear Plush Hopeful Heart), and compare the vector with one or more additional vectors. Each of the additional vectors may be associated with a respective item for sale at an online marketplace.

When comparing two or more vectors, the machine learning model 200 may thus determine a similarity (or dissimilarity) between two vectors and may generate a similarity metric between the two vectors. In some instances, a similarity metric may be a numerical representation of how similar (or dissimilar) two vectors are. If the metric is relatively small, the vectors may be relatively similar, whereas if the metric is relatively large, the vectors may be relatively dissimilar. In other instances, if the metric is relatively large, the vectors may be relatively similar, whereas if the metric is relatively small, the vectors may be relatively dissimilar. Ins some instances, two vectors may be sufficiently similar when the similarity metric is within a threshold range or below a threshold value (e.g., satisfies a similarity metric).

The machine learning training model 200 may determine a vector (or vectors) that the first vector is most-similar to. The vector (or vectors) that the first vector is most similar to may be associated with a particular product (e.g., stuffed animals, bears, stuffed bears, toys, etc.). Accordingly, the user (e.g., a second user, a buyer) may receive one or more listings associated with items having similar vectors.

In a second training phase (e.g., a different training phase), the machine learning model 200 may receive input from one or more users or "sellers" that may intend to sell one or more items (e.g., products) via an online marketplace. The seller may be a user operating a user device, such as a user device 110 as described with respect to FIG. 1. The seller may input a number of parameters describing the item to be listed for sale via an online marketplace. In an example, the user device 110 may present a graphical user interface including a digital form for generation of a listing. A seller may input a multi-modality request to list an item (e.g., a product) for sale that includes an image 205 (e.g., a first image 205) and a title for the listing. The title may include a natural language text (e.g., a first natural language text) as the title for the listing.

In some cases, the seller may input the multi-modality request and the machine learning model 200 may categorize a listing for the item based on an item embedding associated with the image 205 and the text included in the multi-modality request. As used herein, an "item embedding" may refer to a vector representation of the item, which may be associated with a particular category (or categories) that the item is associated with. A listing may be mapped to a particular category (e.g., a particular product category) where the items listed for sale have the same or similar characteristics, but may permit some variation to exist between the items while still being mapped to the same category. In some cases, the seller generating the listing may select or recommend that the listing is for a particular category. The user-recommended category for the listing may be updated or changed by the machine learning model 200.

As described herein and shown in FIG. 3, machine learning model 200 may be trained using position embeddings, segment embeddings, and token embeddings. Upon receiving a multi-modality input (e.g., natural-language text and an image), a system supporting the machine learning model 200 may parse the natural language text to generate a title token. At least a portion of the title token may be masked (e.g., removed, obfuscated) before providing the title token to the transformer encoder. Similarly, the system may divide (e.g., split) the image into multiple sub-images to generate an image token, where each sub-image depicts a portion of the image. At least a portion of the image token may be masked (e.g., removed, obfuscated) before providing the image token to the transformer encoder. The title token and the image token may be provided to the transformer encoder according to their respective segment embeddings and position embeddings.

By way of example, the input text 215 may be "Care Bear Plush Hopeful Heart" and the image 205 may be of a plush bear. The image token may be represented by the "Per-Patch Fully-Connected" and at least one sub-image (e.g., the masked portion "M" of the image 210) may be masked. Additionally or alternatively, the title token may be represented by "Care [MASK] Plush Hopeful Heart." The image token may correspond to position embeddings 0-4 and segment embedding A, and the title token may correspond to position embeddings 0-4 and segment embedding B.

The transformer encoder may utilize image text matching to associate the image token and the title token. Moreover, the transformer encoder may utilize MIM and GMIM, as described herein, to reconstruct the masked portion of the image (e.g., the masked portion "M" of the image 210) and MLM and GMLM to reconstruct the masked portion of the title (e.g., the masked portion of the title token). Accordingly, the machine learning model 200 may identify the masked portion of the image using the title, and may identify the masked portion of the title as "Bear" using the image.

In some examples, the machine learning model 200 may categorize a set of one or more items as being for a particular category by a categorization process. In some instances, the categorization process may be performed based on the machine learning model 200 being trained and may include generating one or more vectors and determining a similarity (e.g., a similarity metric) between two or more vectors. For example, the machine learning model 200 may generate a first vector associated with the image (e.g., the bear) and the text included in the multi-modality request (e.g., Care Bear Plush Hopeful Heart), and compare the vector with one or more additional vectors. Each of the additional vectors may be associated with a respective category of items for sale at an online marketplace. For example, vectors may be associated with a product category, a product type, a product name, a product color, a product size, a manufacturer of a product, a year the product is manufactured, and the like.

When comparing two or more vectors, the machine learning model 200 may thus determine a similarity (or dissimilarity) between two vectors and may generate a similarity metric between the two vectors. In some instances, a similarity metric may be a numerical representation of how similar (or dissimilar) two vectors are. If the metric is relatively small, the vectors may be relatively similar, whereas if the metric is relatively large, the vectors may be relatively dissimilar. In other instances, if the metric is relatively large, the vectors may be relatively similar, whereas if the metric is relatively small, the vectors may be relatively dissimilar. Ins some instances, two vectors may be sufficiently similar when the similarity metric is within a threshold range or below a threshold value (e.g., satisfies a similarity metric).

The machine learning training model 200 may determine a vector (or vectors) that the first vector is most-similar to. The vector (or vectors) that the first vector is most similar to may be associated with a particular product category or categories (e.g., stuffed animals, bears, stuffed bears, toys, etc.).

Accordingly, a user (e.g., a second user, a buyer) may encounter a listing associated with the image and title. For example, a second user may enter a multi-modality search (e.g., including a second image and a second title) and the machine learning model 200 may generate a second vector associated with the image and the text included in the multi-modality request. The second vector may be associated with a same vector as the first vector, thus the second user may encounter the listing associated with the image and title based on the items being categorized within a same product category. The machine learning model 200 may assist sellers in efficiently classifying items (e.g., products) being listed on an online marketplace.

FIG. 3 illustrates an example of a block diagram 300 that supports global embedding learning from different modalities in accordance with aspects of the present disclosure. In some instances, the block diagram 300 may illustrate results (e.g., training results) of the machine learning model 200 described with reference to FIG. 2. For example, the block diagram 300 may illustrate a query for an item and an index set having matching and non-matching results.

In some examples, the machine learning model 200 as described with reference to FIG. 2 may be trained using an image-text online product (ITOP) dataset. ITOP may be a large-scale, diverse, well-distributed and cleanly annotated dataset for training and may include a relatively large quantity of fine-grained categories. Many of the categories may be subtly different, having distinctions that are not easily distinguishable. In some instances, ITOP may utilize a hierarchical taxonomy structure, which is a sub-tree from a real and large eCommerce inventory. ITOP may include meta categories, leaf categories, search products, and index products.

By way of example, a multi-modality search may be provided to the machine learning model 200. The multi-modality request may include the title "Vintage 1983 Kenner 6" CARE BEARS Bedtime Bear Plush Shuffled Animal RARES" and a first image of a bear. As described herein, the machine learning model 200 may generate a vector (e.g., a second vector) based on the multi-modality search and may return one or more listings for the item. The listings may have slightly different titles, or the images of the item may be slightly different, but the machine learning model 200 may generally return listings for the same product.

For example, the machine learning model 200 may return a result for "Vintage Care Bears 13" Plush Stuffed Winking Good Luck Lucky Clover Shamrock," which may be for the same product as specified by the query, despite the title being somewhat different. Additionally or alternatively, the image return may also be somewhat different (e.g., a different perspective, different background lighting, etc.) despite being for the same product. Similarly, the machine learning model 200 may return a result for "Vintage Care Bears 13" Plush Stuffed Bear Good Luck Lucky Clover CareBears Bear," which may be for a same product despite differences in the title, image, or both.

In other instances, the machine learning model 200 may not return results for distractors (e.g., non-matching products). For example, the machine learning model 200 may not return a result for "Care Bears Good Luck Bear 2002 Mint with Tags 13 inch" or "Vintage Care Bears 17" Bedtime Bear Sleepy 25 Years Moon Star Circle Green 1983." These results may not be returned due to their respective vectors being dissimilar to the vector associated with the query provided to the machine learning model 200. That is, the vectors associated with the distractor results may be associated with products in a different product category. Accordingly, the machine learning model 200 may assist sellers in efficiently classifying items (e.g., products) being listed on an online marketplace.

Figure 4:
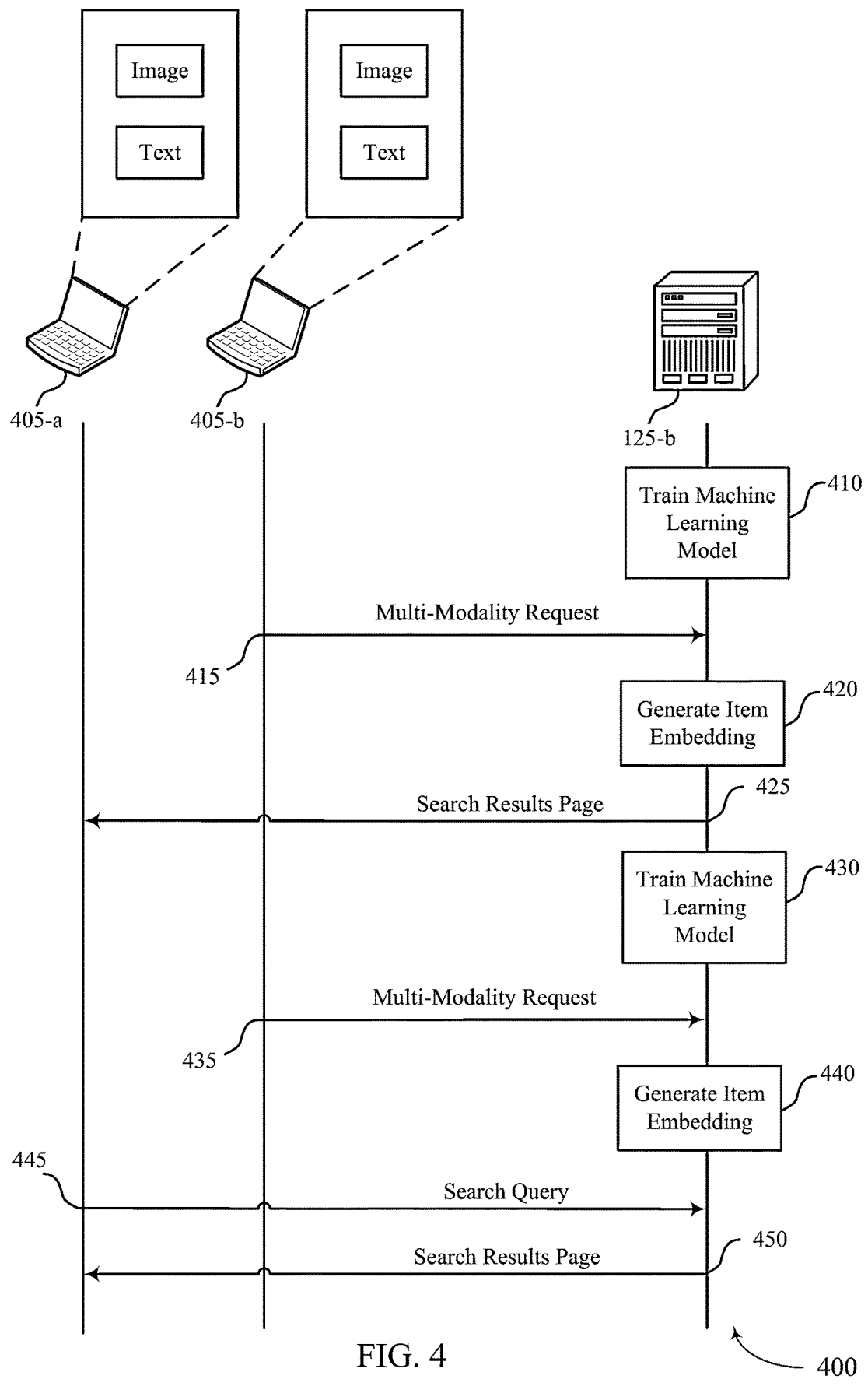
FIG. 4 illustrates an example of a process flow diagram that supports global embedding learning from different modalities in accordance with aspects of the present disclosure.

FIG. 4 illustrates an example of a process flow 400 that supports global embedding learning from different modalities in accordance with aspects of the present disclosure. Process flow 400 may include a server system 125-*b*, a buyer user device 405-*a*, and a seller user device 405-*b*. Server system 125-*b* may be an example of server system 125 as described with reference to FIG. 1. Buyer user device 405-*a* and seller user device 405-*b* may be example of a user device 110 as described with reference to FIG. 1. Seller user device 405-*b* may be a device that a seller uses to upload a multi-modality request generate a listing for the item for sale via an online marketplace. Buyer user device 405-*a* may be a device that a prospective buyer may use to submit a multi-modality query to access the online marketplace, such as via a smart-phone app or a website, to search for items listed for sale and to complete purchase transactions.

At 410, the server system 125-*b* may train a machine learning model as part of a first training phase as described herein with reference to FIGS. 2 and 3. For instance, the server system 125-*b* mask portions of an image, a title, or both using an ITOP dataset. The model may be trained using ITM, MLM, MIM, GMLM, and GMIM such that, when a multi-modality request is received, the server system 125-*b* may generate a vector associated with a product and compare the vector with other vectors associated with items at an online marketplace. To train the model, at least a portion of the title token and the image token may be masked (e.g., removed, obfuscated) and subsequently reconstructed, as described herein.

At 415, the server system 125-*b* may receive a multi-modality request from a seller user device 405-*b*. The multi-modality request may include an image and corresponding natural language text as described herein.

At 420, the server system 125-*b* may generate an item embedding based on the multi-modality request. For example, the server system 125-*b* may parse the natural language text to generate a title token. Additionally or alternatively, the image may be parsed to generate an image token. The title token and image token may be used to generate the item embedding, which may be used (e.g., by the server system 125-*b*) to generate a vector associated with the product. As described herein, the vector may be compared with other vectors, and vectors having a relatively similar similarity metric may be identified.

At 425, the server system 125-*b* may return a search results page to the buyer user device 405-*a* (e.g., by transmitting the search results page via a network). The search results page may include one or more items associated with the image and text provided in the request (e.g., at 415). For example, the displayed items may include different images, different text, or both than provided in the search query (e.g., at 450) but may correspond to similar products as the text and image provided in the search query (e.g., at 415).

At 430, the server system 125-*b* may train a machine learning model as part of a second training phase as described herein with reference to FIGS. 2 and 3. For instance, the server system 125-*b* mask portions of an image, a title, or both using an ITOP dataset. The model may be trained using ITM, MLM, MIM, GMLM, and GMIM such that, when a multi-modality request or multi-modality query is received, the server system 125-*b* may generate a vector associated with a product and classify the product using the vector. To train the model, at least a portion of the title token and the image token may be masked (e.g., removed, obfuscated) and subsequently reconstructed, as described herein.

At 435, the server system 125-*b* may receive a multi-modality request from a seller user device 405-*b*. The multi-modality request may include an image and corresponding natural language text as described herein.

At 440, the server system 125-*b* may generate an item embedding based on the multi-modality request. For example, the server system 125-*b* may parse the natural language text to generate a title token. Additionally or alternatively, the image may be parsed to generate an image token. The title token and image token may be used to generate the item embedding, which may be used (e.g., by the server system 125-*b*) to classify the product associated with the multi-modality request. In some instances, the product may be listed for sale on an online marketplace and may be categorized based on the item embedding generated by the machine learning model. For example, the item may be classified based on a similarity between the image and text.

At 445, the server system 125-*b* may receive a multi-modality request from a buyer user device 405-*a*. The multi-modality query may include an image and corresponding natural language text as described herein. For example, the buyer user device 405-*a* may input whatever text and image a buyer desires as part of a search query. That is, the buyer may input (e.g., via the buyer user device 405-*a*) a text string that includes one or more words, one or more sequences of letters and/or numbers, and/or one or more symbols along with an image of the item the buyer is searching for.

At 450, the server system 125-*b* may return a search results page to the buyer user device 405-*a*. The search results page may include one or more items associated with a same category as the search query. For example, the displayed items may include different images, different text, or both than provided in the search query (e.g., at 450) but may correspond to a same product category as the text and image provided in the search query (e.g., at 450).

The system may use the trained model to classify the received input text and image into a particular category, and may return listings from the particular category (e.g., to the buyer user device 405-*a*) in response to the query. In some instances, the server system 125-*b* may generate a vector based on the search query and may return results within a same product category. In some instances, the search results may contain products within a same category as the item associated with the multi-modality request (e.g., at 440).

Figure 5:
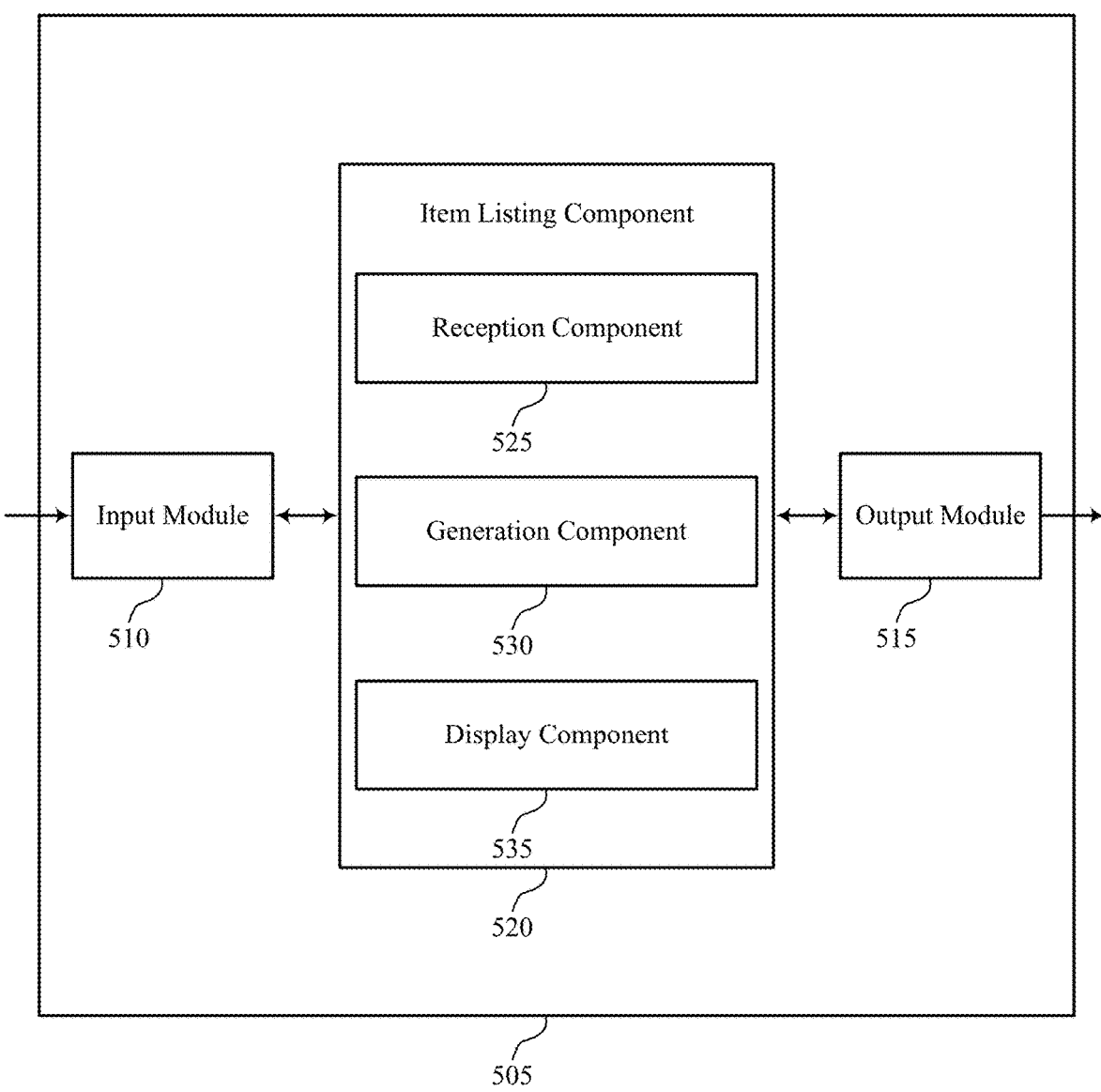
FIG. 5 shows a block diagram of an apparatus that supports global embedding learning from different modalities in accordance with aspects of the present disclosure.

FIG. 5 shows a block diagram 500 of a device 505 that supports global embedding learning from different modalities in accordance with aspects of the present disclosure. The device 505 may include an input module 510, an output module 515, and an item listing component 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the item listing component 520 to support global embedding learning from different modalities. In some cases, the input module 510 may be a component of an I/O controller 710 as described with reference to FIG. 7.

The output module 515 may manage output signals for the device 505. For example, the output module 515 may receive signals from other components of the device 505, such as the item listing component 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the item listing component 520 may include a reception component 525, a generation component 530, a display component 535, or any combination thereof. In some examples, the item listing component 520, or various components thereof, may be configured to perform various operations (e.g., receiving, monitoring, transmitting) using or otherwise in cooperation with the input module 510, the output module 515, or both. For example, the item listing component 520 may receive information from the input module 510, send information to the output module 515, or be integrated in combination with the input module 510, the output module 515, or both to receive information, transmit information, or perform various other operations as described herein.

The reception component 525 may be configured as or otherwise support a means for receiving, via a first user interface associated with an online marketplace, a multi-modality request to retrieve a listing for an item, the multi-modality request including at least a first image and a first natural language text associated with the item. The generation component 530 may be configured as or otherwise support a means for generating, by one or more processors, an item embedding based on inputting the first image and the first natural language text to a machine learning model, where the machine learning model is trained, based on masking a portion of a training title and using a training image to reconstruct the portion of the training title and is trained, based on masking a portion of a training image and using a training title to reconstruct a portion of the training image. The generation component 530 may be configured as or otherwise support a means for generating, by the machine learning model, a first vector associated with the first image and the first natural language text included in the multi-modality request. The display component 535 may be configured as or otherwise support a means for causing presentation, via the first user interface associated with the online marketplace, of one or more listings for the item retrieved based on a similarity metric between the first vector and a second vector of a set of multiple vectors associated with a set of multiple listings.

Figure 6:
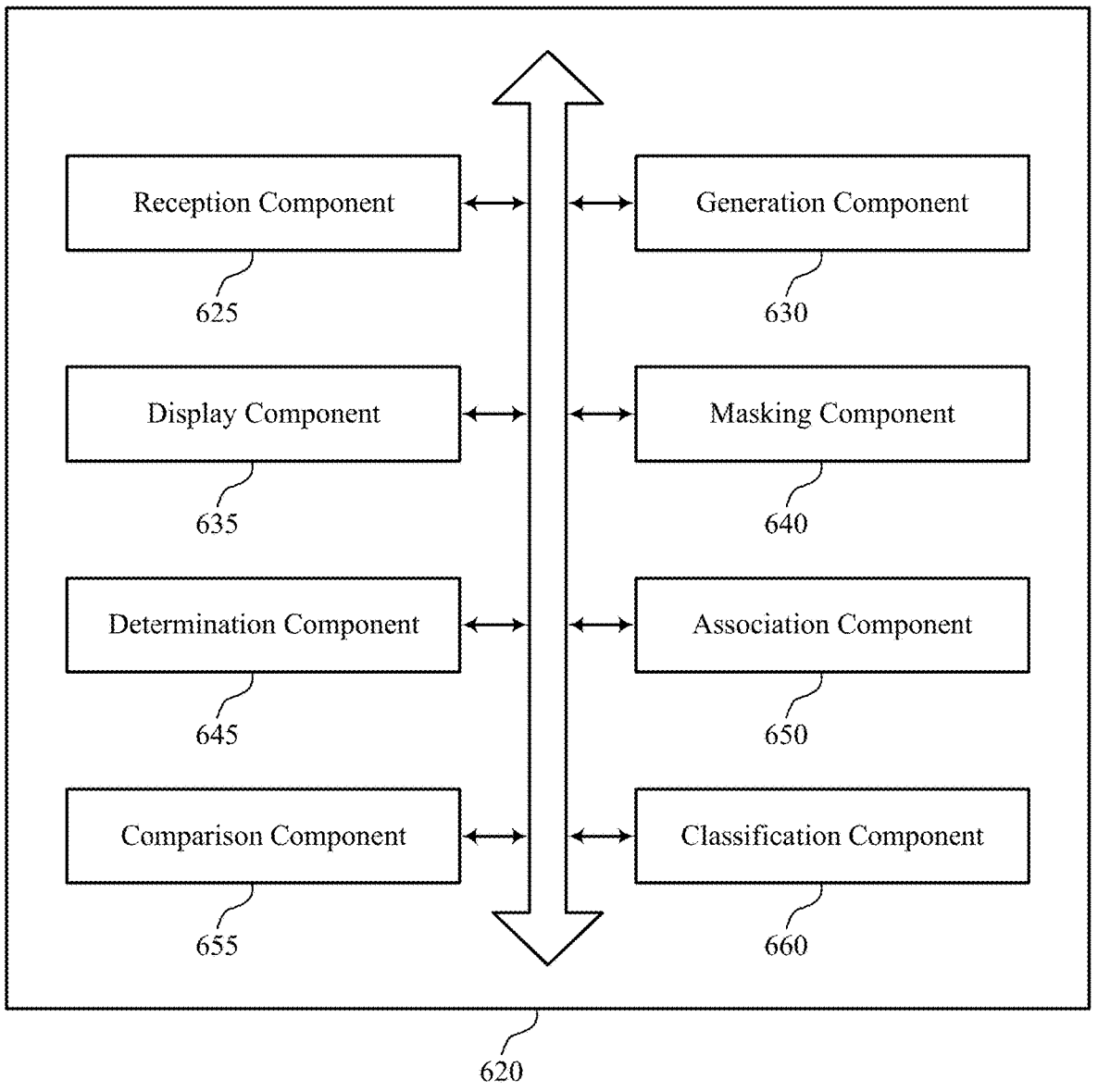
FIG. 6 shows a block diagram of an apparatus that supports global embedding learning from different modalities in accordance with aspects of the present disclosure.

FIG. 6 shows a block diagram 600 of an item listing component 620 that supports global embedding learning from different modalities in accordance with aspects of the present disclosure. The item listing component 620 may be an example of aspects of an item listing component or an item listing component 520, or both, as described herein. The item listing component 620, or various components thereof, may be an example of means for performing various aspects of global embedding learning from different modalities as described herein. For example, the item listing component 620 may include a reception component 625, a generation component 630, a display component 635, a masking component 640, a determination component 645, an association component 650, a comparison component 655, a classification component 660, or any combination thereof. Each of these components may communicate, directly or indirectly, with one another (e.g., via one or more buses).

The reception component 625 may be configured as or otherwise support a means for receiving, via a first user interface associated with an online marketplace, a multi-modality request to retrieve a listing for an item, the multi-modality request including at least a first image and a first natural language text associated with the item. The generation component 630 may be configured as or otherwise support a means for generating, by one or more processors, an item embedding based on inputting the first image and the first natural language text to a machine learning model, where the machine learning model is trained, based on masking a portion of a training title and using a training image to reconstruct the portion of the training title and is trained, based on masking a portion of a training image and using a training title to reconstruct a portion of the training image. In some examples, the generation component 630 may be configured as or otherwise support a means for generating, by the machine learning model, a first vector associated with the first image and the first natural language text included in the multi-modality request. The display component 635 may be configured as or otherwise support a means for causing presentation, via the first user interface associated with the online marketplace, of one or more listings for the item retrieved based on a similarity metric between the first vector and a second vector of a set of multiple vectors associated with a set of multiple listings.

In some examples, to support training the machine learning model, the masking component 640 may be configured as or otherwise support a means for masking a portion of the training image. In some examples, to support training the machine learning model, the generation component 630 may be configured as or otherwise support a means for generating, by the machine learning model, a predicted portion for the training image based on masking the portion of the training image and the training title. In some examples, to support training the machine learning model, the generation component 630 may be configured as or otherwise support a means for generating a predicted listing category based on the predicted portion of the training image.

In some examples, to support training the machine learning model, the masking component 640 may be configured as or otherwise support a means for masking a portion of the training title. In some examples, to support training the machine learning model, the generation component 630 may be configured as or otherwise support a means for generating, by the machine learning model, a predicted portion for a title of the listing based on masking the portion of the training title and the training image. In some examples, to support training the machine learning model, the generation component 630 may be configured as or otherwise support a means for generating a predicted listing category based on the predicted portion for the title.

In some examples, the determination component 645 may be configured as or otherwise support a means for determining, by the machine learning model, a similarity metric between the first vector and a set of multiple vectors associated with a set of multiple categories. In some examples, the association component 650 may be configured as or otherwise support a means for associating, by the machine learning model, the first vector with a first category based on a similarity metric between the first vector and one or more vectors classified by the machine learning model as being associated with the first category.

In some examples, the generation component 630 may be configured as or otherwise support a means for generating, by the machine learning model, a second vector associated with a second image and a second natural language text included in a received multi-modality query. In some examples, the association component 650 may be configured as or otherwise support a means for associating, by the machine learning model, the second vector with the first category. In some examples, the comparison component 655 may be configured as or otherwise support a means for comparing the second vector with a set of multiple vectors that include the first vector, where the first vector is associated with the first category based on the first vector and the second vector satisfying a similarity metric.

In some examples, to support causing presentation of the one or more listings for the item, the display component 635 may be configured as or otherwise support a means for causing presentation, via a second user interface associated with the online marketplace, of one or more listings for the item from a first category, where the one or more listings that include a second image that is different than the first image, a second natural language text that differs from the first natural language text, or both.

In some examples, the comparison component 655 may be configured as or otherwise support a means for comparing the portion of the reconstructed image with the portion of the reconstructed title. In some examples, the classification component 660 may be configured as or otherwise support a means for classifying the listing for the item using the reconstructed image and the reconstructed title based on the portion of the reconstructed image being associated with the portion of the reconstructed title.

Figure 7:
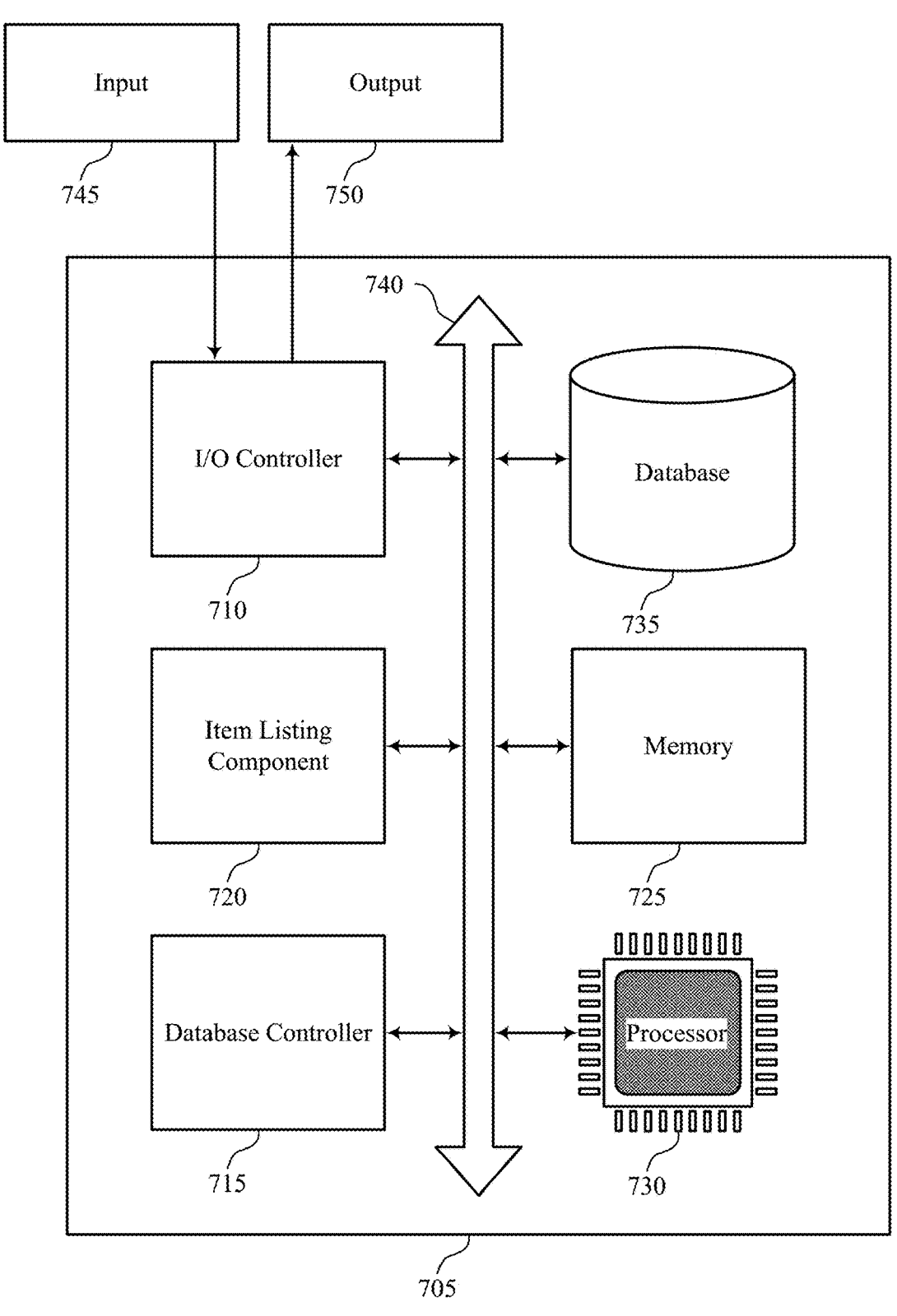
FIG. 7 shows a diagram of a system including a device that supports global embedding learning from different modalities in accordance with aspects of the present disclosure.

FIG. 7 shows a diagram of a system 700 including a device 705 that supports global embedding learning from different modalities in accordance with aspects of the present disclosure. The device 705 may be an example of or include the components of a device 505 as described herein. The device 705 may include components for bi-directional data communications including components for transmitting and receiving communications, such as an item listing component 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a BIOS which may control basic hardware or software operation such as the interaction with peripheral components or devices.

The processor 730 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting global embedding learning from different modalities).

For example, the item listing component 720 may be configured as or otherwise support a means for receiving, via a first user interface associated with an online marketplace, a multi-modality request to retrieve a listing for an item, the multi-modality request including at least a first image and a first natural language text associated with the item. The item listing component 720 may be configured as or otherwise support a means for generating, by one or more processors, an item embedding based on inputting the first image and the first natural language text to a machine learning model, where the machine learning model is trained, based on masking a portion of a training title and using a training image to reconstruct the portion of the training title and is trained, based on masking a portion of a training image and using a training title to reconstruct a portion of the training image. The item listing component 720 may be configured as or otherwise support a means for generating, by the machine learning model, a first vector associated with the first image and the first natural language text included in the multi-modality request. The item listing component 720 may be configured as or otherwise support a means for causing presentation, via the first user interface associated with the online marketplace, of one or more listings for the item retrieved based on a similarity metric between the first vector and a second vector of a set of multiple vectors associated with a set of multiple listings.

FIG. 8 shows a flowchart illustrating a method 800 that supports global embedding learning from different modalities in accordance with aspects of the present disclosure. The operations of the method 800 may be implemented by a Salesforce Device or its components as described herein. For example, the operations of the method 800 may be performed by a Salesforce Device as described with reference to FIGS. 1 through 7. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 805, the method may include receiving, via a first user interface associated with an online marketplace, a multi-modality request to retrieve a listing for an item, the multi-modality request including at least a first image and a first natural language text associated with the item. The operations of 805 may be performed in accordance with examples as disclosed herein. In some examples, aspects of the operations of 805 may be performed by a reception component 625 as described with reference to FIG. 6.

At 810, the method may include generating, by one or more processors, an item embedding based on inputting the first image and the first natural language text to a machine learning model, where the machine learning model is trained, based on masking a portion of a training title and using a training image to reconstruct the portion of the training title and is trained, based on masking a portion of a training image and using a training title to reconstruct a portion of the training image. The operations of 810 may be performed in accordance with examples as disclosed herein. In some examples, aspects of the operations of 810 may be performed by a generation component 630 as described with reference to FIG. 6.

At 815, the method may include generating, by the machine learning model, a first vector associated with the first image and the first natural language text included in the multi-modality request. The operations of 815 may be performed in accordance with examples as disclosed herein. In some examples, aspects of the operations of 815 may be performed by a generation component 630 as described with reference to FIG. 6.

At 820, the method may include causing presentation, via the first user interface associated with the online marketplace, of one or more listings for the item retrieved based on a similarity metric between the first vector and a second vector of a set of multiple vectors associated with a set of multiple listings. The operations of 820 may be performed in accordance with examples as disclosed herein. In some examples, aspects of the operations of 820 may be performed by a display component 635 as described with reference to FIG. 6.

FIG. 9 shows a flowchart illustrating a method 900 that supports global embedding learning from different modalities in accordance with aspects of the present disclosure. The operations of the method 900 may be implemented by a Salesforce Device or its components as described herein. For example, the operations of the method 900 may be performed by a Salesforce Device as described with reference to FIGS. 1 through 7. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 905, the method may include receiving, via a first user interface associated with an online marketplace, a multi-modality request to retrieve a listing for an item, the multi-modality request including at least a first image and a first natural language text associated with the item. The operations of 905 may be performed in accordance with examples as disclosed herein. In some examples, aspects of the operations of 905 may be performed by a reception component 625 as described with reference to FIG. 6.

At 910, the method may include generating, by one or more processors, an item embedding based on inputting the first image and the first natural language text to a machine learning model, where the machine learning model is trained, based on masking a portion of a training title and using a training image to reconstruct the portion of the training title and is trained, based on masking a portion of a training image and using a training title to reconstruct a portion of the training image. The operations of 910 may be performed in accordance with examples as disclosed herein. In some examples, aspects of the operations of 910 may be performed by a generation component 630 as described with reference to FIG. 6.

At 915, the method may include generating, by the machine learning model, a first vector associated with the first image and the first natural language text included in the multi-modality request. The operations of 915 may be performed in accordance with examples as disclosed herein. In some examples, aspects of the operations of 915 may be performed by a generation component 630 as described with reference to FIG. 6.

At 920, the method may include causing presentation, via the first user interface associated with the online marketplace, of one or more listings for the item retrieved based on a similarity metric between the first vector and a second vector of a set of multiple vectors associated with a set of multiple listings. The operations of 920 may be performed in accordance with examples as disclosed herein. In some examples, aspects of the operations of 920 may be performed by a display component 635 as described with reference to FIG. 6.

At 925, the method may include masking a portion of the training image. The operations of 925 may be performed in accordance with examples as disclosed herein. In some examples, aspects of the operations of 925 may be performed by a masking component 640 as described with reference to FIG. 6.

At 930, the method may include generating, by the machine learning model, a predicted portion for the training image based on masking the portion of the training image and the training title. The operations of 930 may be performed in accordance with examples as disclosed herein. In some examples, aspects of the operations of 930 may be performed by a generation component 630 as described with reference to FIG. 6.

At 935, the method may include generating a predicted listing category based on the predicted portion of the training image. The operations of 935 may be performed in accordance with examples as disclosed herein. In some examples, aspects of the operations of 935 may be performed by a generation component 630 as described with reference to FIG. 6.

FIG. 10 shows a flowchart illustrating a method 1000 that supports global embedding learning from different modalities in accordance with aspects of the present disclosure. The operations of the method 1000 may be implemented by a Salesforce Device or its components as described herein. For example, the operations of the method 1000 may be performed by a Salesforce Device as described with reference to FIGS. 1 through 7. In some examples, a Salesforce Device may execute a set of instructions to control the functional elements of the Salesforce Device to perform the described functions. Additionally, or alternatively, the Salesforce Device may perform aspects of the described functions using special-purpose hardware.

At 1005, the method may include receiving, via a first user interface associated with an online marketplace, a multi-modality request to retrieve a listing for an item, the multi-modality request including at least a first image and a first natural language text associated with the item. The operations of 1005 may be performed in accordance with examples as disclosed herein. In some examples, aspects of the operations of 1005 may be performed by a reception component 625 as described with reference to FIG. 6.

At 1010, the method may include generating, by one or more processors, an item embedding based on inputting the first image and the first natural language text to a machine learning model, where the machine learning model is trained, based on masking a portion of a training title and using a training image to reconstruct the portion of the training title and is trained, based on masking a portion of a training image and using a training title to reconstruct a portion of the training image. The operations of 1010 may be performed in accordance with examples as disclosed herein. In some examples, aspects of the operations of 1010 may be performed by a generation component 630 as described with reference to FIG. 6.

At 1015, the method may include generating, by the machine learning model, a first vector associated with the first image and the first natural language text included in the multi-modality request. The operations of 1015 may be performed in accordance with examples as disclosed herein. In some examples, aspects of the operations of 1015 may be performed by a generation component 630 as described with reference to FIG. 6.

At 1020, the method may include causing presentation, via the first user interface associated with the online marketplace, of one or more listings for the item retrieved based on a similarity metric between the first vector and a second vector of a set of multiple vectors associated with a set of multiple listings. The operations of 1020 may be performed in accordance with examples as disclosed herein. In some examples, aspects of the operations of 1020 may be performed by a display component 635 as described with reference to FIG. 6.

At 1025, the method may include masking a portion of the training title. The operations of 1025 may be performed in accordance with examples as disclosed herein. In some examples, aspects of the operations of 1025 may be performed by a masking component 640 as described with reference to FIG. 6.

At 1030, the method may include generating, by the machine learning model, a predicted portion for a title of the listing based on masking the portion of the training title and the training image. The operations of 1030 may be performed in accordance with examples as disclosed herein. In some examples, aspects of the operations of 1030 may be performed by a generation component 630 as described with reference to FIG. 6.

At 1035, the method may include generating a predicted listing category based on the predicted portion for the title. The operations of 1035 may be performed in accordance with examples as disclosed herein. In some examples, aspects of the operations of 1035 may be performed by a generation component 630 as described with reference to FIG. 6.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method, comprising:
generating training data comprising training titles and training images, one or more training titles having a masked title portion and one or more training images have a masked image portion, the generating of the training data comprising:
   masking a portion of a first training image;
   generating a predicted portion for the first training image based at least in part on masking the portion of the first training image and a title of the first training image; and
   generating a predicted listing category for the first training image based at least in part on the predicted portion for the first training image;
training a machine learning model based on the training data;
receiving, via a first user interface associated with an online marketplace, a multi-modality request to retrieve a listing for an item, the multi-modality request comprising at least a first image and a first natural language text associated with the item;
generating, by the machine learning model, a first image token based at least in part on the first image and a first title token based at least in part on the first natural language text;
generating, by the machine learning model, a first vector based on the first image token and the first title token; and
causing presentation, via the first user interface associated with the online marketplace, of one or more listings for the multi-modality request based at least in part on a similarity metric between the first vector and each vector of a plurality of vectors associated with a plurality of listings.

2. The computer-implemented method of claim 1, wherein generating the training data further comprises:
masking a portion of the title of the first training image;
generating a predicted portion for a title of the listing based at least in part on the portion of the title of the first training image and the first training image; and
generating a predicted listing category based at least in part on the predicted portion for the title.

3. The computer-implemented method of claim 1, further comprising:
determining, by the machine learning model, a similarity metric between the first vector and a plurality of vectors associated with a plurality of categories; and
associating, by the machine learning model, the first vector with a first category based at least in part on a similarity metric between the first vector and one or more vectors classified by the machine learning model as being associated with the first category.

4. The computer-implemented method of claim 3, further comprising:
generating, by the machine learning model, a second vector associated with a second image and a second natural language text included in a received multi-modality query;
associating, by the machine learning model, the second vector with the first category; and comparing the second vector with a plurality of vectors that include the first vector, wherein the first vector is associated with the first category based at least in part on the first vector and the second vector satisfying a similarity metric.

5. The computer-implemented method of claim 1, wherein causing presentation of the one or more listings for the item comprises:
causing presentation, via a second user interface associated with the online marketplace, of one or more listings for the item from a first category, wherein the one or more listings that comprise a second image that is different than the first image, a second natural language text that differs from the first natural language text, or both.

6. The computer-implemented method of claim 1, further comprising:
comparing the portion of the training image with the portion of the training title based at least in part on reconstructing the portion of the training image and reconstructing the portion of the training title; and
classifying the listing for the item using the training image and the training title based at least in part on the portion of the training image being associated with the portion of the training title.

7. The computer-implemented method of claim 1, further comprising:
associating the first vector with a product category based at least in part on the similarity metric between the first vector and vectors classified as being associated with the product category.

8. An apparatus, comprising:
a processor;
memory coupled with the processor; and
instructions stored in the memory and executable by the processor to cause the apparatus to:
   generating training data comprising training titles and training images, one or more training titles having a masked title portion and one or more training images have a masked image portion, the generating of the training data comprising:
   masking a portion of a first training image:
      masking a portion of a first training image;
      generating a predicted portion for the first training image based at least in part on masking the portion of the first training image and a title of the first training image; and
      generating a predicted listing category for the first training image based at least in part on the predicted portion for the first training image;
   train a machine learning model based on the training data;
   receive, via a first user interface associated with an online marketplace, a multi-modality request to retrieve a listing for an item, the multi-modality request comprising at least a first image and a first natural language text associated with the item;
   generate a first image token based at least in part on the first image and a first title token based at least in part on the first natural language text;
   generate, by the machine learning model, a first vector based on the first image token and the first title token; and
   cause presentation, via the first user interface associated with the online marketplace, of one or more listings for the multi-modality request based at least in part on a similarity metric between the first vector and each vector of a plurality of vectors associated with a plurality of listings.

9. The apparatus of claim 8, wherein generating the training data further comprises:

mask a portion of the title of the first training image;

generate a predicted portion for a title of the listing based at least in part on the portion of the title of the first training image and the first training image; and generate a predicted listing category based at least in part on the predicted portion for the title.

10. The apparatus of claim 8, wherein the instructions are further executable by the processor to cause the apparatus to:

determine, by the machine learning model, a similarity metric between the first vector and a plurality of vectors associated with a plurality of categories; and associate, by the machine learning model, the first vector with a first category based at least in part on a similarity metric between the first vector and one or more vectors classified by the machine learning model as being associated with the first category.

11. The apparatus of claim 10, wherein the instructions are further executable by the processor to cause the apparatus to:

generate, by the machine learning model, a second vector associated with a second image and a second natural language text included in a received multi-modality query;

associate, by the machine learning model, the second vector with the first category; and compare the second vector with a plurality of vectors that include the first vector, wherein the first vector is associated with the first category based at least in part on the first vector and the second vector satisfying a similarity metric.

12. The apparatus of claim 8, wherein the instructions to cause presentation of the one or more listings for the item are executable by the processor to cause the apparatus to:

cause presentation, via a second user interface associated with the online marketplace, of one or more listings for the item from a first category, wherein the one or more listings that comprise a second image that is different than the first image, a second natural language text that differs from the first natural language text, or both.

13. The apparatus of claim 8, wherein the instructions are further executable by the processor to cause the apparatus to:

compare the portion of the training image with the portion of the training title based at least in part on reconstructing the portion of the training image and reconstructing the portion of the training title; and classify the listing for the item using the training image and the training title based at least in part on the portion of the training image being associated with the portion of the training title.

14. The apparatus of claim 8, wherein the instructions are further executable by the processor to cause the apparatus to:

associate the first vector with a product category based at least in part on the similarity metric between the first vector and vectors classified as being associated with the product category.

15. A non-transitory computer-readable medium storing code, the code comprising instructions executable by a processor to perform operations comprising:

generating training data comprising training titles and training images, one or more training titles having a masked title portion and one or more training images have a masked image portion, the generating of the training data comprising:

masking a portion of a first training image;

masking a portion of a first training image;

generating a predicted portion for the first training image based at least in part on masking the portion of the first training image and a title of the first training image; and generating a predicted listing category for the first training image based at least in part on the predicted portion for the first training image;

training a machine learning model based on the training data;

receiving, via a first user interface associated with an online marketplace, a multi-modality request to retrieve a listing for an item, the multi-modality request comprising at least a first image and a first natural language text associated with the item;

generating a first image token based at least in part on the first image and a first title token based at least in part on the first natural language text;

generating, by the machine learning model, a first vector based on the first image token and the first title token; and causing presentation, via the first user interface associated with the online marketplace, of one or more listings for the multi-modality request based at least in part on a similarity metric between the first vector and each vector of a plurality of vectors associated with a plurality of listings.

16. The non-transitory computer-readable medium of claim 15, wherein generating the training data further comprises:

mask a portion of the title of the first training image;

generate a predicted portion for a title of the listing based at least in part on the portion of the title of the first training image and the first training image; and generate a predicted listing category based at least in part on the predicted portion for the title.

17. The non-transitory computer-readable medium of claim 15, wherein the instructions are further executable by the processor to perform operations comprising:

determining, by the machine learning model, a similarity metric between the first vector and a plurality of vectors associated with a plurality of categories; and associating, by the machine learning model, the first vector with a first category based at least in part on a similarity metric between the first vector and one or more vectors classified by the machine learning model as being associated with the first category.

18. The non-transitory computer-readable medium of claim 17, wherein the instructions are further executable by the processor to perform operations comprising:

generating, by the machine learning model, a second vector associated with a second image and a second natural language text included in a received multi-modality query;

associating, by the machine learning model, the second vector with the first category; and compare the second vector with a plurality of vectors that include the first vector, wherein the first vector is associated with the first category based at least in part on the first vector and the second vector satisfying a similarity metric.

19. The non-transitory computer-readable medium of claim 15, wherein the instructions to cause presentation of the one or more listings for the item are executable by the processor to:

cause presentation, via a second user interface associated with the online marketplace, of one or more listings for the item from a first category, wherein the one or more listings that comprise a second image that is different than the first image, a second natural language text that differs from the first natural language text, or both.

20. The non-transitory computer-readable medium of claim 15, wherein the instructions are further executable by the processor to perform operations comprising:

comparing the portion of the training image with the portion of the training title based at least in part on reconstructing the portion of the training image and reconstructing the portion of the training title; and classifying the listing for the item using the training image and the training title based at least in part on the portion of the training image being associated with the portion of the training title.

\* \* \* \* \*